United States Patent
Procopio

(10) Patent No.: US 10,958,732 B1
(45) Date of Patent: Mar. 23, 2021

(54) SERVERLESS ARCHIVE FILE CREATION AND EXTRACTION SYSTEM AND SERVERLESS, IN-BROWSER, CLOUD STORAGE ENABLED METHODS FOR OPENING, DECOMPRESSING, AND CREATING ARCHIVE FILES

(71) Applicant: Michael Jeffrey Procopio, Boulder, CO (US)

(72) Inventor: Michael Jeffrey Procopio, Boulder, CO (US)

( * ) Notice: Subject to any disclaimer, the term of this patent is extended or adjusted under 35 U.S.C. 154(b) by 0 days.

(21) Appl. No.: 16/911,629

(22) Filed: Jun. 25, 2020

Related U.S. Application Data

(60) Provisional application No. 62/969,253, filed on Feb. 3, 2020.

(51) Int. Cl.
| | |
|---|---|
| *G06F 16/00* | (2019.01) |
| *H04L 29/08* | (2006.01) |
| *H04L 9/32* | (2006.01) |
| *H04L 29/06* | (2006.01) |

(52) U.S. Cl.
CPC ........ *H04L 67/1097* (2013.01); *H04L 9/3226* (2013.01); *H04L 69/04* (2013.01)

(58) Field of Classification Search
CPC ......... G06F 16/24549; G06F 16/90335; G06F 16/90332; G06Q 30/016
See application file for complete search history.

(56) References Cited

U.S. PATENT DOCUMENTS

| | | | | |
|---|---|---|---|---|
| 6,427,149 B1* | 7/2002 | Rodriguez | ............ | G06F 16/116 709/219 |
| 6,560,618 B1* | 5/2003 | Ims | ............ | G06F 9/445 |
| 6,604,106 B1* | 8/2003 | Bodin | ............ | H04L 29/06 |
| 6,879,988 B2* | 4/2005 | Basin | ............ | H03M 7/30 |
| 7,506,010 B2* | 3/2009 | Kulkarni | ............ | G06F 11/1451 |
| 7,634,572 B2* | 12/2009 | Nanduri | ............ | H04L 63/166 709/219 |
| 8,117,315 B2* | 2/2012 | Diep | ............ | G06F 16/957 709/227 |
| 8,176,321 B1* | 5/2012 | Perry | ............ | H04L 67/2819 713/167 |

(Continued)

*Primary Examiner* — Polina G Peach
(74) *Attorney, Agent, or Firm* — Plager Schack LLP; Mark H. Plager; Stephen Hallberg

(57) ABSTRACT

A method is disclosed for web-based, in-browser, cloud-storage-enabled opening of, decompression of, and creation of encrypted/password-protected or non-encrypted archive files in which the method is implemented as a software application that connects to a web service, meaning the software can be a web app running in any web browser and on any operating system, device, or platform, so that no manual installation and maintenance of a platform-specific application executable is required. The method-implementing software application performs all processing of archive file contents directly in-browser on the user's device, which is maximally secure for the user, such that when the archive file is retrieved, which may be done either locally on-device or from a cloud-based file storage provider, it is able to perform the operational features including compression, decompression, encryption, decryption, and rich preview.

16 Claims, 8 Drawing Sheets

(56) References Cited

U.S. PATENT DOCUMENTS

| | | | |
|---|---|---|---|
| 8,452,853 B2* | 5/2013 | Batra | G06F 9/44526 |
| | | | 709/219 |
| 9,213,684 B2 | 12/2015 | Lai et al. | |
| 9,680,967 B2* | 6/2017 | Kim | H04L 67/28 |
| 9,746,844 B2* | 8/2017 | Bryant | G06F 16/27 |
| 9,838,494 B1* | 12/2017 | Tomasiewicz | G06F 16/71 |
| 10,404,799 B2* | 9/2019 | Mitkar | G06F 16/214 |
| 2002/0143785 A1* | 10/2002 | Pugh | G06F 16/10 |
| 2004/0103215 A1* | 5/2004 | Ernst | H04L 69/04 |
| | | | 709/247 |
| 2008/0141373 A1* | 6/2008 | Fossen | H04L 63/145 |
| | | | 726/23 |
| 2011/0209046 A1* | 8/2011 | Huang | G06F 16/9577 |
| | | | 715/234 |
| 2013/0024700 A1* | 1/2013 | Peterson | H04L 69/329 |
| | | | 713/189 |
| 2013/0227078 A1* | 8/2013 | Wei | H04L 67/2871 |
| | | | 709/219 |
| 2013/0346379 A1 | 12/2013 | Loe et al. | |
| 2014/0006347 A1* | 1/2014 | Qureshi | G06F 21/53 |
| | | | 707/621 |
| 2014/0136944 A1* | 5/2014 | Harris | G06F 40/103 |
| | | | 715/234 |
| 2015/0113040 A1* | 4/2015 | Marquess | H04L 67/2828 |
| | | | 709/202 |
| 2015/0163326 A1 | 6/2015 | Pan et al. | |
| 2015/0301900 A1* | 10/2015 | Whitehead | H04L 67/1095 |
| | | | 709/219 |
| 2016/0285948 A1* | 9/2016 | Saint-Hilaire | H04L 65/608 |
| 2017/0060976 A1* | 3/2017 | Harnik | G06F 16/1744 |
| 2020/0226102 A1* | 7/2020 | Natanzon | G06F 16/1748 |

\* cited by examiner

US 10,958,732 B1

SERVERLESS ARCHIVE FILE CREATION AND EXTRACTION SYSTEM AND SERVERLESS, IN-BROWSER, CLOUD STORAGE ENABLED METHODS FOR OPENING, DECOMPRESSING, AND CREATING ARCHIVE FILES

CLAIM OF BENEFIT TO PRIOR APPLICATION

This application claims benefit to U.S. Provisional Patent Application 62/969,253, entitled "WEB-BASED, IN-BROWSER (SERVERLESS), CLOUD STORAGE ENABLED METHOD FOR OPENING; DECOMPRESSING; AND CREATING ENCRYPTED AND PASSWORD-PROTECTED ARCHIVE FILES IN ZIP FILE FORMAT," filed Feb. 3, 2020. The U.S. Provisional Patent Application 62/969,253 is incorporated herein by reference.

BACKGROUND

Embodiments of the invention described in this specification relate generally to tools for working with compressed archive files, and more particularly, to web-based, in-browser (i.e., serverless), cloud storage enabled methods for opening, decompressing, and creating archive files, where the archive files are encrypted and are password-protected or not encrypted and not protected by password and a cloud-based serverless archive file creation and extraction system.

Conventional archive files are often used to contain and compress multiple files but currently there is no option for a serverless web-based archive compression and decompression tool for creating and opening compressed archive files purely in a web-based cloud context, without the need of downloading or installing additional software. Specifically, one problem is that the existing conventional applications require a user to download and install separate software, namely a binary application that is specific to just one operating system or platform that must be manually installed and updated by users. Also, another problem is that existing conventional applications do not fully integrate with internet-based cloud storage providers and web-based email programs. Furthermore, a problem exists with the conventional applications which only support a subset of archive file compression formats. And yet another problem is evident in the existing conventional applications which only support a subset of archive encryption/decryption methods for working with password protected compressed archive files.

Therefore, what is needed is a way to provide universal ability to read and create compressed archive files purely inside a web browser, with no backend server processing required, from a variety of locations, providing universal compatibility for all formats and sub-formats and version of the archive file format, including universal and comprehensive ability to work with encrypted archive files using a user-supplied password or archive files with no encryption.

BRIEF DESCRIPTION

A novel cloud-based serverless archive file creation and extraction system and novel serverless, in-browser, cloud storage enabled methods are disclosed for opening, decompressing, and creating archive files containing compressed files that are optionally encrypted and password-protected.

In some embodiments, the cloud-based serverless archive file creation and extraction system includes a serverless in-browser compression, decompression, and rich preview processing engine, a cloud server that delivers the serverless in-browser compression, decompression, and rich preview processing engine as a web page resource to a browser running on a user computing device, and a file storage location module that identifies archive file retrieval and storage locations. In some embodiments, the serverless in-browser compression, decompression, and rich preview processing engine includes a serverless JavaScript web app that implements archive file read and write (create) functions, archive file compression and decompression functions, and encryption and decryption functions.

In some embodiments, the serverless, in-browser, cloud storage enabled methods for opening, decompressing, and creating archive files containing compressed files that are optionally encrypted and password-protected are collectively implemented as a serverless JavaScript web app that provides universal ability to read and create compressed archive files purely inside a web browser, with no backend server processing required, from a variety of locations, providing universal compatibility for all formats and sub-formats and version of the archive file format, including universal and comprehensive ability to work with encrypted archive archives using a user-supplied password, or alternatively, to work with archive archives that are not encrypted and require no password.

In some embodiments, the web-based, serverless in-browser, cloud storage enabled methods for opening, decompressing, and creating archive files include a cloud-based serverless archive file compression process. In some embodiments, the cloud-based serverless archive file compression process performs a plurality of creation steps comprising (i) receiving, from a web browser application that is connected to a website while running on a computing device associated with a user, a selection to create an archive file, (ii) launching an app initialization module in the web browser application, (iii) receiving, by the web browser application, one or more files to add to the archive file intended to be created, (iv) creating the archive file and associating the one or more files to add to the archive file by an archive writer module running in the web browser application, (v) compressing the archive file and the associated one or more files added to the archive file by a compression module running in the web browser application, (vi) displaying the archive file and the one or more files to add to the archive file, (vii) optionally encrypting the archive file and the associated one or more compressed files added to the archive file, by an archive encryption module running in the web browser application, when the user chooses to encrypt the archive file and provides a password to secure the archive file, and (viii) saving the archive file as a compressed archive file at a user-specified location comprising one of a local storage unit associated with the computing device of the user and a cloud storage unit accessible by the user.

In some embodiments, the web-based, serverless in-browser, cloud storage enabled methods for opening, decompressing, and creating archive files include a cloud-based serverless archive file decompression process. In some embodiments, the cloud-based serverless archive file decompression process performs a plurality of decompression steps for opening an archive file comprising (i) launching an app, by an app initialization module, in a web browser application that is connected to a website while running on a computing device associated with a user, (ii) receiving, from the app in the web browser application that is running on the computing device associated with the user, an archive file identifier ("archive file ID" or "archive ID") and an archive file source comprising one of a local storage unit associated with the computing device of the user and a cloud storage unit accessible by the user in connection with a selection to open an archive file, (iii) reading, by a cloud storage module running in the web browser application, archive file data of the archive file associated with the archive file ID and the archive file source from a particular location comprising one of the local storage unit associated with the computing device of the user and the cloud storage unit accessible by the user, (iv) parsing, by an archive reader module running in the web browser application, the archive file data, (v) displaying, by the archive reader module running in the web browser application, the archive file contents in a view of the web browser, (vi) receiving, in connection with the view of the archive file contents in the web browser, check box selections of particular archive file content items comprising one of a single archive file content item among an entirety of the archive file contents, a plurality of archive file content items among the entirety of the archive file contents, and an entirety of archive file content items that is equal in number to the entirety of the archive file contents, (vi) decrypting, by an archive decryption module running in the web browser application, the particular archive file content items from the archive file (when the archive file is encrypted and based on a valid user-provided password), (vii) decompressing the particular archive file content items by a decompression module running in the web browser application, (viii) writing the decompressed particular archive file content items to at least one of the local storage unit associated with the computing device of the user, the cloud storage unit accessible by the user, and any other cloud storage location, and (ix) displaying the decompressed particular archive file content items in another view of the web browser.

In some embodiments, the web-based, serverless in-browser, cloud storage enabled methods for opening, decompressing, and creating archive files include a cloud-based serverless archive file rich preview process. In some embodiments, the cloud-based serverless archive file rich preview process performs a plurality of rich preview steps for rendering a selection of an uncompressed archive file content item and providing a page preview of the selected uncompressed archive file content item comprising (i) launching an app, by an app initialization module, in a web browser application that is connected to a website while running on a computing device associated with a user, (ii) receiving, from the app in the web browser application that is running on the computing device associated with the user, an archive file identifier ("archive file ID" or "archive ID") and an archive file source comprising one of a local storage unit associated with the computing device of the user and a cloud storage unit accessible by the user in connection with a selection to open an archive file, (iii) reading, by a cloud storage module running in the web browser application, archive file data of the archive file associated with the archive file ID and the archive file source from a particular location comprising one of the local storage unit associated with the computing device of the user and the cloud storage unit accessible by the user, (iv) parsing, by an archive reader module running in the web browser application, the archive file data, (v) displaying, by the archive reader module running in the web browser application, the archive file contents in a view of the web browser, (vi) receiving, in connection with the view of the archive file contents in the web browser, a single check box selection of an uncompressed archive file content item in the archive file contents, (vi) decrypting, by an archive decryption module running in the web browser application, the selected uncompressed archive file content item from the archive file (when the archive file is encrypted and based on a valid user-provided password), (vii) decompressing the selected uncompressed archive file content item by a decompression module running in the web browser application, (viii) rendering content of the decompressed archive file content item in realtime by an archive rendering module running in the web browser application, (ix) generating a rich preview of the rendered content of the decompressed archive file content item, and (x) displaying the generated rich preview of the rendered content of the decompressed archive file content item in the web browser.

In some embodiments, the serverless, in-browser, cloud storage enabled methods for opening, decompressing, and creating archive files containing compressed files that are optionally encrypted and password-protected ensure that (i) all possible archive file format variants are fully supported, such that there is no archive file variant that the software application (which implements the method) cannot decompress, (ii) all possible archive file encryption formats are fully supported, such that there is no password-protected archive file variant that this application cannot decompress, (iii) password-protected encryption is optional (not required) for archive file creation and compression, decompression of compressed archive files, and opening/reading and is only required when an existing archive file is encrypted and password-protected or when a user chooses to encrypt and secure with a password a newly created archive file, (iv) the software application which implements the method directly integrates with multiple cloud storage providers in both an active referral context (cloud storage provider calling out to the application) and passive retrieval context (user selects an archive file from cloud storage provider), which includes both for accessing the archive file to decompress, as well as for accessing individual files that are desired to compress into a new archive file, (v) use of the method-implementing software application requires only accessing a web service, which can be done in any web browser and on any operating system, device, or platform, so that no manual installation and maintenance of a platform-specific application executable is required, and (vi) the method-implementing software application performs all processing of archive file contents directly in-browser on the user's device, which is maximally secure for the user, such that when the archive file is retrieved, which may be done either locally on-device or from a cloud-based file storage provider, no further information is sent over the network and all compression, decompression, encryption, and/or decryption is done on-device, in the actual web browser, securely, thereby ensuring that there is no server or backend required to process the data.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
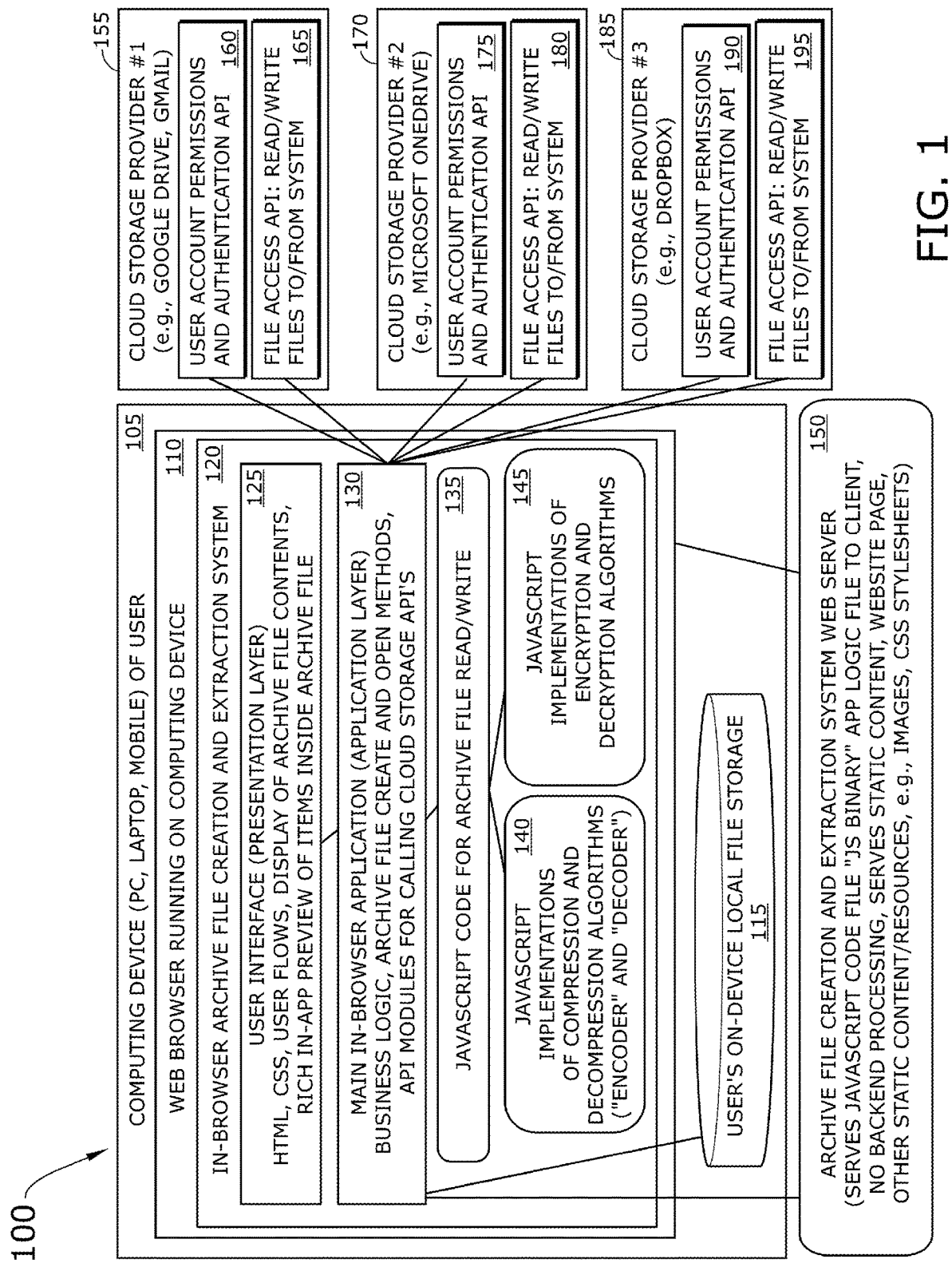
FIG. 1 conceptually illustrates a master architecture of a cloud-based serverless archive file creation and extraction system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

For purposes of the inventive embodiments described in this specification, the terms "archive" and "archive file" refer to a single file that contains many separate files. These individual files can be extracted from the main archive. The separate files within the archive file may be compressed or encrypted (or both compressed and encrypted). Thus, the terms "archive" and "archive file" refer individually and collectively to archives containing files that are neither compressed nor encrypted, archives containing files that are compressed and not encrypted, and archives containing files that are both compressed and encrypted, with multiple such contained files mixed between any of these combinations of compressed and/or encrypted.

Some embodiments of the invention include a novel cloud-based serverless archive file creation and extraction system and novel serverless, in-browser, cloud storage enabled methods for opening, decompressing, and creating archive files containing compressed files that are optionally encrypted and password-protected.

In some embodiments, the cloud-based serverless archive file creation and extraction system includes a serverless in-browser compression, decompression, and rich preview processing engine, a cloud server that delivers the serverless in-browser compression, decompression, and rich preview processing engine as a web page resource to a browser running on a user computing device, and a file storage location module that identifies archive file retrieval and storage locations. In some embodiments, the serverless in-browser compression, decompression, and rich preview processing engine includes a serverless JavaScript web app that implements archive file read and write (create) functions, archive file compression and decompression functions, and encryption and decryption functions.

In some embodiments, the web-based, serverless in-browser, cloud storage enabled methods for opening, decompressing, and creating archive files include a cloud-based serverless archive file compression process. In some embodiments, the web-based, serverless in-browser, cloud storage enabled methods for opening, decompressing, and creating archive files include a cloud-based serverless archive file decompression process. In some embodiments, the web-based, serverless in-browser, cloud storage enabled methods for opening, decompressing, and creating archive files include a cloud-based serverless archive file rich preview process. In some embodiments, the serverless, in-browser, cloud storage enabled methods for opening, decompressing, and creating archive files containing compressed files that are optionally encrypted and password-protected are collectively implemented as a serverless JavaScript web app that provides universal ability to read and create compressed archive files purely inside a web browser, with no backend server processing required, from a variety of locations, providing universal compatibility for all formats and sub-formats and version of the archive file format, including universal and comprehensive ability to work with encrypted archive files using a user-supplied password, or alternatively, to work with archive files that are not encrypted and require no password.

In some embodiments, the cloud-based serverless archive file compression process performs a plurality of creation steps comprising (i) receiving, from a web browser application that is connected to a website while running on a computing device associated with a user, a selection to create an archive file, (ii) launching an app initialization module in the web browser application, (iii) receiving, by the web browser application, one or more files to add to the archive file intended to be created, (iv) creating the archive file and associating the one or more files to add to the archive file by an archive writer module running in the web browser application, (v) compressing the archive file and the associated one or more files added to the archive file by a compression module running in the web browser application, (vi) displaying the archive file and the one or more files to add to the archive file, (vii) optionally encrypting the archive file and the associated one or more compressed files added to the archive file, by an archive encryption module running in the web browser application, when the user chooses to encrypt the archive file and provides a password to secure the archive file, and (viii) saving the archive file as a compressed archive file at a user-specified location comprising one of a local storage unit associated with the computing device of the user and a cloud storage unit accessible by the user.

In some embodiments, the cloud-based serverless archive file decompression process performs a plurality of decompression steps for opening an archive file comprising (i) launching an app, by an app initialization module, in a web browser application that is connected to a website while running on a computing device associated with a user, (ii) receiving, from the app in the web browser application that is running on the computing device associated with the user, an archive file identifier ("archive file ID" or "archive ID") and an archive file source comprising one of a local storage unit associated with the computing device of the user and a cloud storage unit accessible by the user in connection with a selection to open an archive file, (iii) reading, by a cloud storage module running in the web browser application, archive file data of the archive file associated with the archive file ID and the archive file source from a particular location comprising one of the local storage unit associated with the computing device of the user and the cloud storage unit accessible by the user, (iv) parsing, by an archive reader module running in the web browser application, the archive file data, (v) displaying, by the archive reader module running in the web browser application, the archive file contents in a view of the web browser, (vi) receiving, in connection with the view of the archive file contents in the web browser, check box selections of particular archive file content items comprising one of a single archive file content item among an entirety of the archive file contents, a plurality of archive file content items among the entirety of the archive file contents, and an entirety of archive file content items that is equal in number to the entirety of the archive file contents, (vi) decrypting, by an archive decryption module running in the web browser application, the particular archive file content items from the archive file (when the archive file is encrypted and based on a valid user-provided password), (vii) decompressing the particular archive file content items by a decompression module running in the web browser application, (viii) writing the decompressed particular archive file content items to at least one of the local storage unit associated with the computing device of the user, the cloud storage unit accessible by the user, and any other cloud storage location, and (ix) displaying the decompressed particular archive file content items in another view of the web browser.

In some embodiments, the cloud-based serverless archive file rich preview process performs a plurality of rich preview steps for rendering a selection of an uncompressed archive file content item and providing a page preview of the selected uncompressed archive file content item comprising (i) launching an app, by an app initialization module, in a web browser application that is connected to a website while running on a computing device associated with a user, (ii) receiving, from the app in the web browser application that is running on the computing device associated with the user, an archive file identifier ("archive file ID" or "archive ID") and an archive file source comprising one of a local storage unit associated with the computing device of the user and a cloud storage unit accessible by the user in connection with a selection to open an archive file, (iii) reading, by a cloud storage module running in the web browser application, archive file data of the archive file associated with the archive file ID and the archive file source from a particular location comprising one of the local storage unit associated with the computing device of the user and the cloud storage unit accessible by the user, (iv) parsing, by an archive reader module running in the web browser application, the archive file data, (v) displaying, by the archive reader module running in the web browser application, the archive file contents in a view of the web browser, (vi) receiving, in connection with the view of the archive file contents in the web browser, a single check box selection of an uncompressed archive file content item in the archive file contents, (vi) decrypting, by an archive decryption module running in the web browser application, the selected uncompressed archive file content item from the archive file (when the archive file is encrypted and based on a valid user-provided password), (vii) decompressing the selected uncompressed archive file content item by a decompression module running in the web browser application, (viii) rendering content of the decompressed archive file content item in realtime by an archive rendering module running in the web browser application, (ix) generating a rich preview of the rendered content of the decompressed archive file content item, and (x) displaying the generated rich preview of the rendered content of the decompressed archive file content item in the web browser.

In some embodiments, the serverless, in-browser, cloud storage enabled methods for opening, decompressing, and creating archive files containing compressed files that are optionally encrypted and password-protected ensure that (i) all possible archive file format variants are fully supported, such that there is no archive file variant that the software application (which implements the method) cannot decompress, (ii) all possible archive file encryption formats are fully supported, such that there is no password-protected archive file variant that this application cannot decompress, (iii) password-protected encryption is optional (not required) for archive file creation, decompressing, and opening/reading and is only required when an existing archive file is encrypted and password-protected or when a user chooses to encrypt and secure with a password a newly created archive file (iv) the software application which implements the method directly integrates with multiple cloud storage providers in both an active referral context (cloud storage provider calling out to the application) and passive retrieval context (user selects an archive file from cloud storage provider), which includes both for accessing the archive file to decompress, as well as for accessing individual files that are desired to compress into a new archive file, (v) use of the method-implementing software application requires only accessing a web service, which can be done in any web browser and on any operating system, device, or platform, so that no manual installation and maintenance of a platform-specific application executable is required, and (vi) the method-implementing software application performs all processing of archive file contents directly in-browser on the user's device, which is maximally secure for the user, such that when the archive file is retrieved, which may be done either locally on-device or from a cloud-based file storage provider, no further information is sent over the network and all compression, decompression, encryption, and/or decryption is done on-device, in the actual web browser, securely, thereby ensuring that there is no server or backend required to process the data.

As stated above, conventional compressed archive files are often used to contain multiple files but currently there is no option for a serverless web-based archive compression and decompression tool for creating and opening compressed archive files purely in a web-based cloud context, without the need of downloading or installing additional software. Specifically, one problem is that the existing conventional applications require a user to download and install separate software, namely a binary application that is specific to just one operating system or platform that must be manually installed and updated by users. Also, another problem is that existing conventional applications do not fully integrate with internet-based cloud storage providers and web-based email programs. Furthermore, a problem exists with the conventional applications which only support a subset of archive file compression formats. And yet another problem is evident in the existing conventional applications which only support a subset of archive encryption/decryption methods for working with password protected compressed archives.

Embodiments of the serverless, in-browser, cloud storage enabled methods for opening, decompressing, and creating archive files containing compressed files that are optionally encrypted and password-protected described in this specification solve such problems through several features including at least (i) universal availability, whereby software that implements the method is written as a pure JavaScript application, meaning it can run in any web browser on any operating system and on any device (computer or iPhone/Android tablet, phone, or other mobile device), (ii) no installation requirement since the application is available as a web service without the need to download any other software or download or install any binary application such as a separate program executable or app store app, (iii) universal archive format compatibility due to the software application including a comprehensive set of codes allowing for full support of the archive file format, as well as other related archive or compression formats including RAR, TAR, GZIP, BZIP, and others, (iv) usage of JavaScript decompression routines, such that the software application can access, decompress, and extract every possible file in an archive and any archive file in any format, through the correct detection of compression format and utilization of relevant custom-written in-browser web-based pure JavaScript decompression routines (methods, codes, algorithms), where the compression algorithms include at least STORE (no compression) and DEFLATE (standard compression), as well as more advanced compression formats internal to compressed archive files including BZIP, LZMA, PPMD, and others, (v) universal archive file access and retrieval, which ensures that the software will work on archive files that can come from a large range of locations applicable to web-based software (e.g., the archive file can be read locally from, or created and saved to, the user's device using browser-based file storage APIs, universally and on all platforms and operating systems, including at least phone, tablet, and computer) and the archive file can also come from one or more cloud-based file storage providers, including by active referral, and (vi) universal encryption, and decryption support whereby the software implementation of the method includes first-of-a-kind web-based implementations of decryption and encryption algorithms for (optionally or selectively) creating encrypted, password-protected archive files and for accessing password-protected archive files that are encrypted.

Embodiments of the serverless, in-browser, cloud storage enabled methods for opening, decompressing, and creating archive files containing compressed files that are optionally encrypted and password-protected described in this specification differ from and improve upon currently existing options. In particular, some embodiments differ because, when the method is implemented as a software application, it is a pure web-based application integrated with multiple cloud-storage providers providing universal compatibility with all possible archive file formats for accessing and creating archive files and no installation of any program executable or binary is required. Furthermore, the software application provides first-of-a-kind capability for web-based in-browser access and decompress encrypted archive files, namely those archive files that are password protected and have been encrypted according to various existing approaches via a user-supplied password, but also with full capability to create, decompress, and open/read non-encrypted archive files that are not secured by password protection. The method/software application performs all processing entirely inside the web browser, meaning that no data is sent or stored on any backend. As such, once an archive file is received from a cloud-based storage provider or from the user's local device, even within a web browser, all decompression and compression, decryption and encryption (when required to decompress or selected to create), is done locally inside the web browser execution engine without sending any data over the network.

In addition, most existing systems (and any and all web-based systems) will unexpectedly fail to operate correctly on certain archive files. For instance, archive files compressed according to certain advanced compression algorithms would typically fail in the existing web-based or other systems. Specifically, the existing systems typically, but unexpectedly, fail to open, access, or decrypt certain archive files compressed with advanced encryption techniques, including Advanced Encryption Standard (AES) encryption, and other advanced encryption techniques, regardless of the key strength. Similarly, existing systems also are known to have trouble in some cases with non-encrypted archive files with no password protection. Additionally, most existing systems cannot directly integrate with cloud-based storage providers, requiring the cumbersome step of having to manually download an archive file first from the storage provider. This is even more the case for all the non-web-based systems, which require the manual step of downloading, installing, and maintaining a separate application binary. As most existing web-based systems are simply web-based user-interface front-ends, the bulk of processing and calculations works is still done in the backend server, which is less secure, and exposes the user's data to the application developers, including potentially nefarious storage, access, or manipulation of that user data either by the application developer or a third-party that gains access to the server where backend processing is done.

In contrast, the serverless, in-browser, cloud storage enabled methods for opening, decompressing, and creating archive files containing compressed files that are optionally encrypted and password-protected of the present disclosure completely solves the existing issues and problems because (i) all possible archive file format variants are fully supported, so there are no archive file variants that this application cannot decompress, (ii) all possible archive file encryption formats are fully supported, such that there are no password-protected archive file variants that this application cannot decompress, and the application can always work with archive files that are not encrypted and have no password protection, (iii) the application directly integrates with multiple cloud storage providers in both an active referral context (cloud storage provider calling out to the application) and passive retrieval context (user selects an archive file from cloud storage provider), which includes both for accessing the archive file to decompress, as well as for accessing individual files that are desired to compress into a new archive file, (iv) use of this application requires only accessing a web service, which can be done in any web browser and on any operating system, device, or platform, so there is no manual installation and maintenance of a platform-specific application executable is not required, and (v) the application performs all processing of archive file contents directly in-browser on the user's device, which is maximally secure for the user, and once the archive file is retrieved, which may be done either locally on-device or from a cloud-based file storage provider, no further information is sent over the network because all compression, decompression, encryption, and/or decryption is done on-device, in the actual web browser, securely, without involvement of a server or a backend processor required to process the data.

The serverless, in-browser, cloud storage enabled methods for opening, decompressing, and creating archive files containing compressed files that are optionally encrypted and password-protected of the present disclosure generally works in a serverless, in-browser software-implemented process that runs on computing devices when implemented as an in-browser JavaScript archive file processing engine, with no backend processing, with software subroutines, namely, JavaScript implementations of multiple compression and decompression algorithms specific to the archive file format, as well as JavaScript implementations of encryption and decryption algorithms specific to the archive file format.

In a preferred embodiment, a web-based interface provided via a static web page delivered to the user's web browser is used within the web browser to access and work with the serverless in-browser, cloud storage enabled methods, and wraps the specified subroutines and logic and algorithms together in a way that exposes two key user flows, specifically, (1) extract (open or decompress) an archive file and (2) create an archive file. By visiting the web-based interface (the web page or website), a user is able to open an archive file either locally or from a cloud-based storage location, or alternatively, they may choose to create an archive file. Yet, all archive file processing is performed entirely locally, within the browser instance, as a JavaScript engine. In this way, creation of an encrypted archive never requires transmission of a password (or encryption key) over the network, but is entirely contained within the browser instance (i.e., within memory of the computing device only).

An authentication flow is supported in which authentication is performed when the archive file comes from a cloud-based storage provider, thereby requiring that the user must first be authenticated (user account verified) according to the authorization and account APIs and standards exposed by the specific cloud-storage provider. This authentication flow is invoked any time account verification is required for cloud-based storage system access, which can occur from reading an archive file from cloud storage provider, saving or extracting an archive file or a file contained within the archive file to a cloud storage provider, or accessing one or more files from a cloud-storage provider to store inside a newly created archive file. The authentication flow is also supported during archive file read and decrypt operations, whereby the archive file is parsed and read using the archive file reading routines, and when an archive file is (optionally or selectively) encrypted, the user will be prompted for a password and the decryption subroutines employed in-browser. Another flow is performed for archive file item preview or download, such as when the user chooses to view or download an individual file inside the archive file, then the selected file (and only that individual selected file) is decompressed in memory and rendered to the user or downloaded. Another flow is performed for archive file extract, such as when the user chooses to extract one or more items from the archive file—all operations are asynchronous and parallelizable, i.e., multiple files can be uploaded in parallel and all operations can be canceled. Furthermore, all operations are able to be retrieved in the event of an error.

To make the serverless, in-browser, cloud storage enabled methods for opening, decompressing, and creating archive files containing compressed files that are optionally encrypted and password-protected of the present disclosure, one may design, write (encode), and publish a software application requiring expertise in software engineering, encryption and decryption methods, binary file access and manipulation (read/write), user interfaces across multiple platforms, web-based UI tool kits, web-based systems, cloud-storage provider integration, secure user account authentication, as well as asynchronous and parallel processing, without the need for a backend server or backend processor.

In this specification, there are several descriptions of methods and processes that are implemented as software applications and run on computing devices to perform the steps of the web-based, serverless in-browser, cloud storage enabled methods for opening, decompressing, and creating encrypted/password-protected or non-encrypted archive files. However, it should be noted that for the purposes of the embodiments described in this specification, the word "method" is used interchangeably with the word "process". Methods or processes for opening, decompressing, and creating encrypted/password-protected or non-encrypted archive files are described, therefore, by reference to several example methods and processes that conceptually illustrate process steps for opening, decompressing, and creating encrypted/password-protected or non-encrypted archive files.

Several more detailed embodiments are described in the sections below. Section I describes a cloud-based serverless archive file creation and extraction system. Section II describes a cloud-based serverless archive file compression process. Section III describes a cloud-based serverless archive file decompression process. Section IV describes a cloud-based serverless archive file rich preview process. Section V describes a detailed decompression process. Section VI describes an electronic system that implements some embodiments of the invention.

I. Cloud-Based Serverless Archive File Creation and Extraction System

In some embodiments, the cloud-based serverless archive file creation and extraction system includes a serverless in-browser compression, decompression, and rich preview processing engine, a cloud server that delivers the serverless in-browser compression, decompression, and rich preview processing engine as a web page resource to a browser running on a user computing device, and a file storage location module that identifies archive file retrieval and storage locations. In some embodiments, the serverless in-browser compression, decompression, and rich preview processing engine includes a serverless JavaScript web app that implements archive file read and write (create) functions, archive file compression and decompression functions, and encryption and decryption functions.

By way of example, FIG. 1 conceptually illustrates a master architecture of a cloud-based serverless archive file creation and extraction system 100. As shown in this figure, the master architecture of a cloud-based serverless archive file creation and extraction system 100 includes a computing device 105, a web browser 110 that runs on the computing device 105, a local file storage 115 that is a permanent file storage unit on the computing device 105, and an in-browser archive file creation and extraction system 120 that is run within the web browser 110. Additionally, a user interface 125 is included at a presentation layer of the in-browser archive file creation and extraction system 120 and a main in-browser application 130 is included at an application layer of the in-browser archive file creation and extraction system 120.

Several items shown in the master architecture of the cloud-based serverless archive file creation and extraction system 100 are external to the in-browser archive file creation and extraction system 120, as well as each of the local file storage 115, the web browser 110, and the computing device 105. Specifically, several cloud storage providers and an archive file creation and extraction web server 150 are illustrated.

The several cloud storage providers shown in this figure include a first cloud storage provider 155, a second cloud storage provider 170, and a third cloud storage provider 185. The several cloud storage providers are exemplary cloud storage providers. Therefore, the several cloud storage providers are not intended as being limited to only these cloud storage provider examples, but are presented to demonstrate the flexibility a user of cloud-based serverless archive file creation and extraction system 100 would have in accessing files and content from sources that are external to on-device local storage, such as the local file storage 115 of the computing device 105. For example, the first cloud storage provider 155 may be Google Drive cloud storage or Gmail, the second cloud storage provider 170 may be cloud storage from Microsoft OneDrive, while the third cloud storage provider 185 may be DropBox. Whatever the type or provider of the cloud storage, the main in-browser application 130 includes API modules for calling the cloud storage APIs. The cloud storage APIs shown in this figure include user account permissions and authentication APIs 160, 175, and 190 for the first cloud storage provider 155, the second cloud storage provider 170, and the third cloud storage provider 185, respectively. Similarly, the cloud storage APIs include file access APIs—i.e., file access API 165 for the first cloud storage provider 155, file access API 180 for the second cloud storage provider 170, and file access API 195 for the third cloud storage provider 185—to read and write files to and from the in-browser archive file creation and extraction system 120.

The archive file creation and extraction web server 150 serves a JavaScript code file (or "JS binary" file) to the web browser 110 when the computing device 105 connects over a network to the archive file creation and extraction web server 150. The JavaScript code file includes application logic that is used locally in the web browser 110 running on the computing device 105 by the main in-browser application 130 at the application layer of the in-browser archive file creation and extraction system 120. In some embodiments, the web browser 110 accesses a cached (stored) JS binary code file after the archive file creation and extraction web server 150 has transmitted the JS binary code file to the web browser 110 during a prior network connection. In this way, the main in-browser application 130 can load the JavaScript code file in an "offline mode" in which the web browser 110 does not make a network connection to the archive file creation and extraction web server 150. The functionality of the JavaScript code file in "offline mode" is the same as in "online mode" (when actively connected over the network to the archive file creation and extraction web server 150). That is, the archive file create and open methods are fully available since the "offline mode" loading of the JavaScript code file triggers the corresponding JavaScript code for archive file read/write 135. A user of "offline mode" archive file creation or extraction would simply use the web browser 110 running on the computing device 105 without a network connection to the archive file creation and extraction web server 150, instead allowing the web browser 110 to load a local browser-stored cached version of the web page on which to access the archive file creation and extraction tools (which includes the JavaScript code file with the JavaScript implementations of encoder and decoder 140, as well as the JavaScript implementations of encryption and decryption algorithms 145). While many descriptions in the present disclosure refer to the archive file creation and extraction web server 150 serving the JavaScript code file to the user's web browser, the functionality of "offline mode" is implied as a possible operational mode (an alternative to "online mode" operation) from which the user can utilize any and all functionality of archive file creation and extraction, with the exception that accessing cloud storage is limited to operational use of the web browser 110 when actively connected in "online mode" to a public network (i.e., the Internet). Nevertheless, even when the web browser 110 is actively connected in "online mode" to the public network, it is still possible to load the local browser-stored cached version of the web page for archive file creation and extraction without making a network connection to the archive file creation and extraction web server 150. Furthermore, regardless of whether running in "online mode" or in "offline mode", the fundamental operations carried out by the archive file creation and extraction processes are always performed in-browser, locally on the computing device of the user.

This is shown in the main in-browser application 130 as business logic which is executed when archive file create and open methods are called. Specifically, the archive file create and open methods trigger JavaScript code for archive file read/write 135. Furthermore, the JavaScript code for archive file read/write 135 include JavaScript implementations of decompression ("decoder") and compression ("encoder") algorithms 140 and JavaScript implementations of encryption and decryption algorithms 145. Additionally, the main in-browser application 130 includes API modules for calling cloud storage APIs. In this way, the main in-browser application 130 can access any of the cloud storage providers upon user-specified command via the user interface 125 at the presentation layer of the in-browser archive file creation and extraction system 120.

The archive file creation and extraction web server 150 only serves static content—delivering the JS binary application logic file and the website page to the web browser 110 running on the computing device 105. Therefore, the archive file creation and extraction web server 150 performs no backend processing of its own. All processing of archive files (for opening, decompressing, creating, encrypting, decrypting, etc.) is performed within the web browser 110 instance running on the computing device 105.

Figure 2:
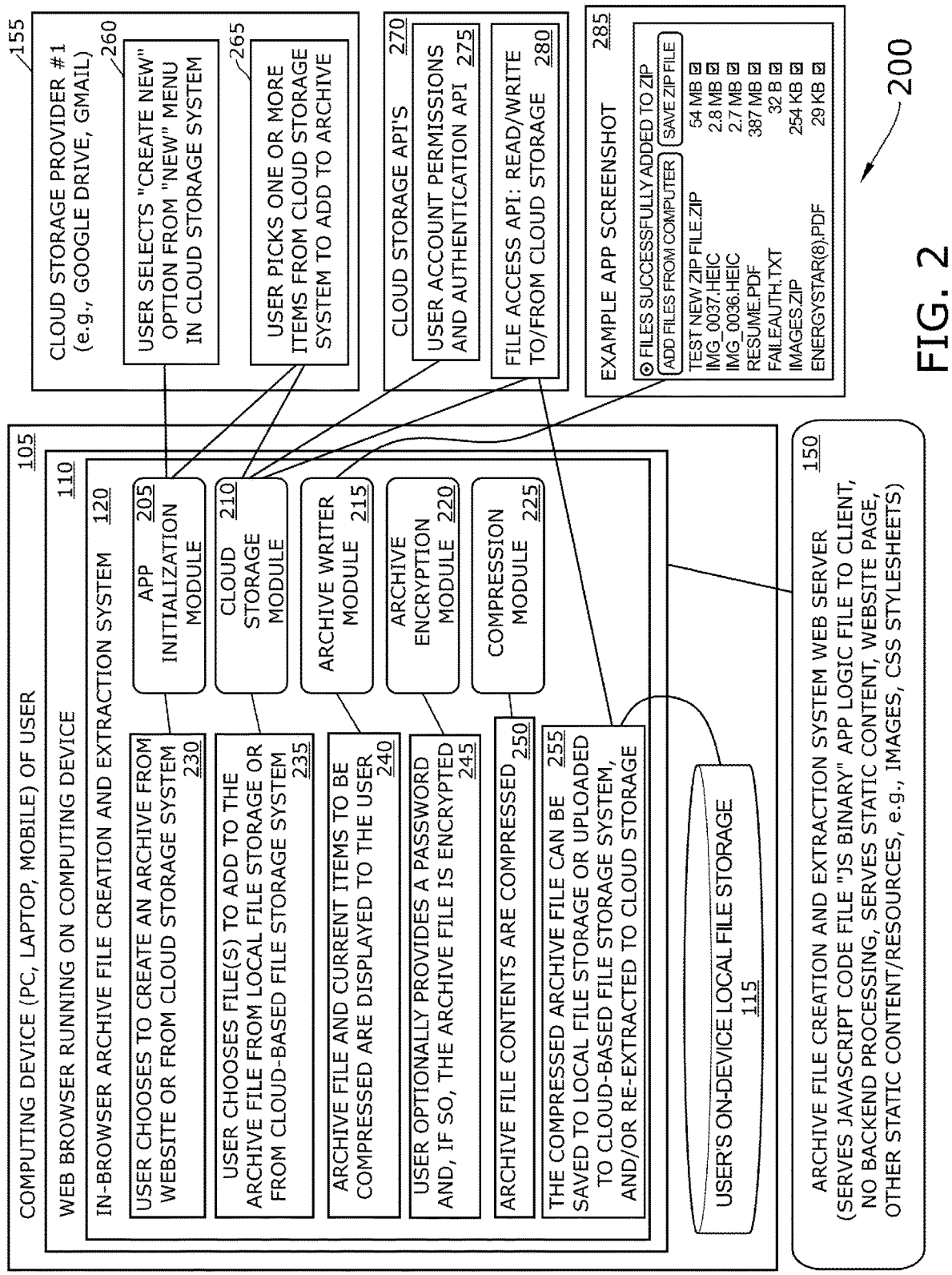
FIG. 2 conceptually illustrates an archive creation view of an architecture of a cloud-based serverless archive creation and extraction system in some embodiments.

Turning to another example, FIG. 2 conceptually illustrates an archive creation view of an architecture of a cloud-based serverless archive creation and extraction system ("cloud-based serverless archive creation and extraction system archive creation architecture 200"). As shown in this figure, the cloud-based serverless archive creation and extraction system archive creation architecture 200 includes the computing device 105 of the user, the web browser 110 that runs on the computing device 105, the local file storage 115 as an on-device permanent file storage unit, and the in-browser archive file creation and extraction system 120 that is run within the web browser 110. The archive file creation and extraction web server 150 and the first cloud storage provider 155 are also shown as external components. Unlike the three exemplary cloud storage providers and associated APIs, described above by reference to FIG. 1, the cloud-based serverless archive creation and extraction system archive creation architecture 200 demonstrates cloud storage APIs 270 generally for any such cloud storage provider. The cloud storage APIs 270 include the user account permissions and authentication API 275 and the file access API 280 to read and write to and from the respective cloud storage provider. The cloud-based serverless archive creation and extraction system archive creation architecture 200 also demonstrates an example app screenshot 285 with several files added to the archive and ready to be compressed and saved as an archive file.

Additionally, several steps of the encoder algorithm, as implemented by the JavaScript code for archive file read/write 135 within the in-browser archive file creation and extraction system 120 that is running in the web browser 110, are illustrated in this figure. These several encoder steps are performed in connection with several modules for specific functions. In particular, an app initialization module 205 is employed when a user chooses to create an archive from website or from cloud storage system (at 230). When the user is creating the archive from the cloud storage system, the app initialization module 205 performs API code in connection with the user selecting a "create new" option from a "new" menu (or context-sensitive pop-up menu) in the respective cloud storage system (at 260). Then the user may pick one or more items from the cloud storage system to add to the archive (at 265) which the app initialization module 205 receives to start creation of the archive.

On the other hand, when the user chooses to create the archive from the website (at 230), the user can choose (at 235) to select files locally (e.g., from the user's on-device local file storage 115) or from a cloud storage provider. When a cloud storage provider option is selected, a cloud storage module 210 can receive the user selection of one or more items from the cloud storage system to add to the archive (at 265), or when another cloud storage provider is specified, load the user account permissions and authentication API 275 and the file access API 280 to logon to the other cloud storage provider and pick one or more files from the other cloud storage provider to include in the archive.

Upon receiving the one or more files to add to the archive, the archive file and current items to be compressed are displayed for the user (at 240) by an archive writer module 215. An example of how this is displayed for the user is demonstrated by the example app screenshot 285. Next, the user may optionally provide a password to encrypt the archive (at 245), which is a function handled by the archive encryption module 220.

Whether the user encrypts the archive or not, the archive file contents are compressed (at 250) when the user is finished adding files/items to the archive. A compression module 225 is loaded to perform the compression of files/items listed for the archive. After compression, the compressed archive file is saved (at 255). In particular, the compressed archive file can be saved to the local file storage 115 or uploaded to a cloud-based file storage system (e.g., one of the several cloud storage providers or other cloud-based storage). Additionally, the files in the compressed archive file can be re-extracted to the user-specified cloud storage instead of, or in addition to, saving the compressed archive file in the cloud storage.

Figure 3:
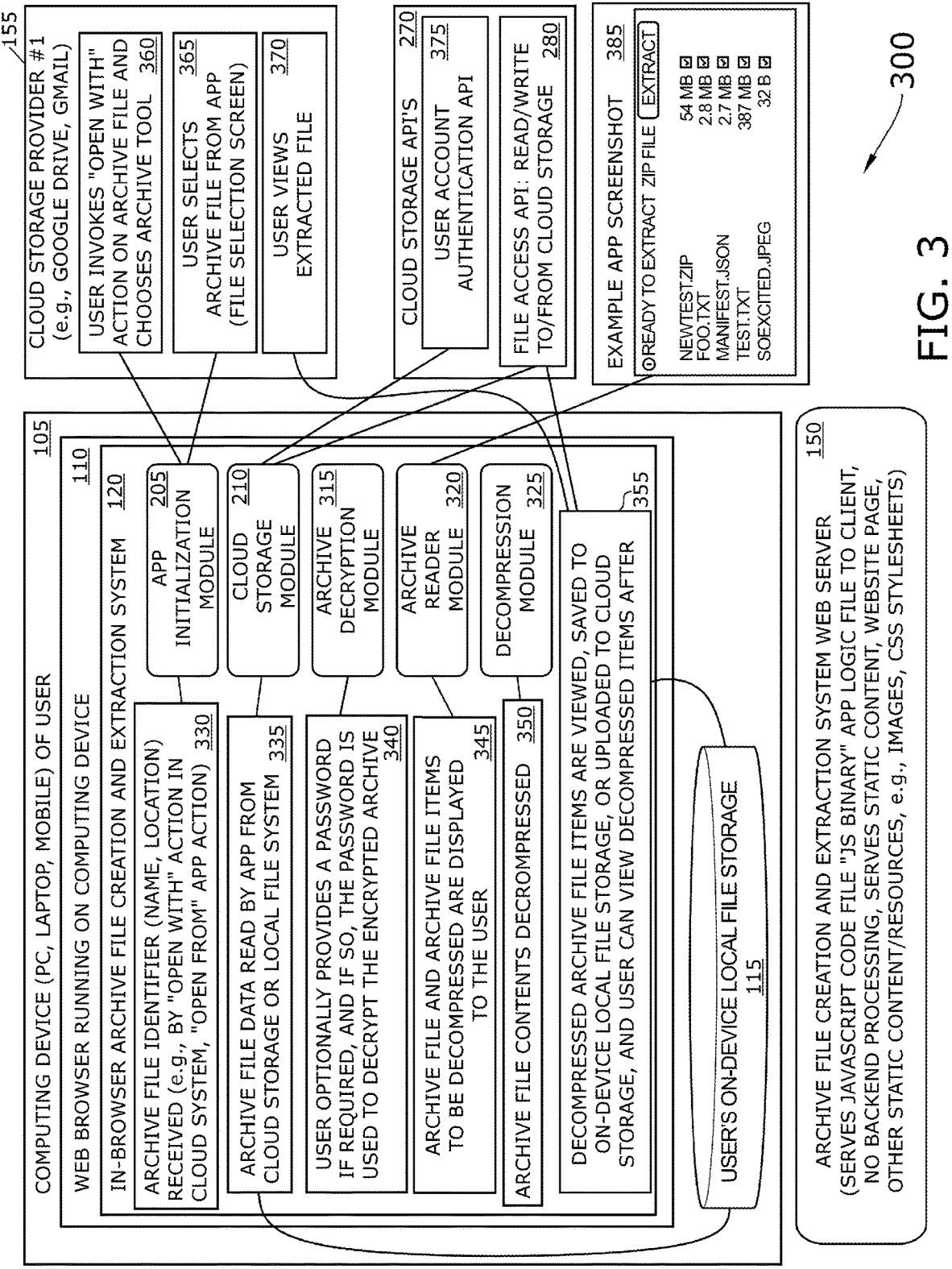
FIG. 3 conceptually illustrates an archive extraction view of an architecture of a cloud-based serverless archive creation and extraction system in some embodiments.

While the above example pertains largely to creation of a new compressed archive file, the next example relates to decompressing and extracting a previously created archive file. By way of example, FIG. 3 conceptually illustrates an archive extraction view of an architecture of a cloud-based serverless archive creation and extraction system ("cloud-based serverless archive creation and extraction system archive extraction architecture 300").

As shown in this figure, the cloud-based serverless archive creation and extraction system archive extraction architecture 300 includes the computing device 105 of the user, the web browser 110 that runs on the computing device 105, the local file storage 115 as an on-device permanent file storage unit, and the in-browser archive file creation and extraction system 120 that is run within the web browser 110. The archive file creation and extraction web server 150 and the first cloud storage provider 155 are also shown as external components. Unlike the three exemplary cloud storage providers and associated APIs, described above by reference to FIG. 1, the cloud-based serverless archive creation and extraction system archive extraction architecture 300 demonstrates cloud storage APIs 270 (with a user account authentication API 375 and the file access API 280) generally for any such cloud storage provider, similar to the cloud-based serverless archive creation and extraction system archive creation architecture 200 described above by reference to FIG. 2. The cloud-based serverless archive creation and extraction system archive extraction architecture 300 also demonstrates another example app screenshot 385 of an archive file with contents ready for extraction.

Additionally, several steps of the decoder algorithm, as implemented by the JavaScript code for archive file read/write 135 within the in-browser archive file creation and extraction system 120 that is running in the web browser 110, are illustrated in this figure. These several decoder steps are performed in connection with several modules for specific functions. In particular, the app initialization module 205 is triggered by a user selecting an archive file identifier (at 330) which is performed by an "open with" action in a cloud system or an "open from" web app action. The app initialization module 205 receives a selection of an archive tool for by user invoking the "open with" action on an archive file (at 360), followed by the user selecting a particular archive file from the app's file select screen (at 365).

Next, the data of the particular archive file is read (at 335) from cloud storage or the local file storage 115. When read from cloud storage, the cloud storage module 210 is invoked and the user provides account authentication via the user account authentication API 375 and the cloud storage module 210 accesses the particular archive file for read access by way of the file access API 280 made available through the respective cloud storage provider.

When the particular archive file is encrypted, then a password is required to decrypt the particular archive file for the purposes of displaying the listed files stored in the archive as well as decompressing the particular archive file. Thus, the user optionally provides a password (at 340) when required for decryption, which is used by an archive decryption module 315 to decrypt the encrypted archive file. After decryption (when required), the contents of the particular archive file are capable of being displayed in a list of items stored in the archive and, at user's command, previewed (via rich preview) and/or decompressed (entirely or individually).

After reading the data of the particular archive file, and (optionally, if required) decrypting the archive file via user-provided password, the archive file and the archive file items to be decompressed are displayed in a list of archive items (at 345) for the user to see. The list of archive file items is visually output by an archive reader module 320 in a particular list format, such as that shown by the example app screenshot 385. After decryption (when required) and displaying the listed items in the archive for user to view, the contents of the particular archive file are decompressed (at 350) by a decompression module 325.

Next, the decompressed archive file items are viewed by the user, saved to the local file storage 115, or uploaded to the user-specified cloud storage provider for persistent cloud storage (at 355). The user can view the items afterwards at will, whether viewing extracted files (at 370) stored at the first cloud storage provider 155 or any other cloud storage provider or in the local file storage 115.

While the example architectures described above by reference to FIGS. 2 and 3 included some exemplary encoder and decoder steps, other example processes for compressing files in an archive (or creating compressed archive files) and decompressing existing archive files are described below, by reference to FIGS. 4 and 5. In addition, an example process for generating and displaying a rich preview of a compressed item of an archive file is described below by reference to FIG. 6. Specifically, these example processes, described by reference to FIGS. 4-6, follow in the next three sections.

II. Cloud-Based Serverless Archive File Compression Process

In some embodiments, the cloud-based serverless archive file compression process performs a plurality of creation steps comprising (i) receiving, from a web browser application that is connected to a website while running on a computing device associated with a user, a selection to create an archive file, (ii) launching an app initialization module in the web browser application, (iii) receiving, by the web browser application, one or more files to add to the archive file intended to be created, (iv) displaying the archive file and the one or more files to add to the archive file for compression, (v) creating the archive file and associating the one or more files to add to the archive file by an archive writer module running in the web browser application, (vi) compressing the archive file and the associated one or more files added to the archive file by a compression module running in the web browser application, (vii) optionally encrypting the archive file and the associated one or more files added to the archive file, by an archive encryption module running in the web browser application (serverless, JavaScript engine), when the user chooses to encrypt the archive file and provides a password to secure the archive file, and (viii) saving the archive file as a compressed archive file at a user-specified location comprising one of a local storage unit associated with the computing device of the user and a cloud storage unit accessible by the user.

Figure 4:
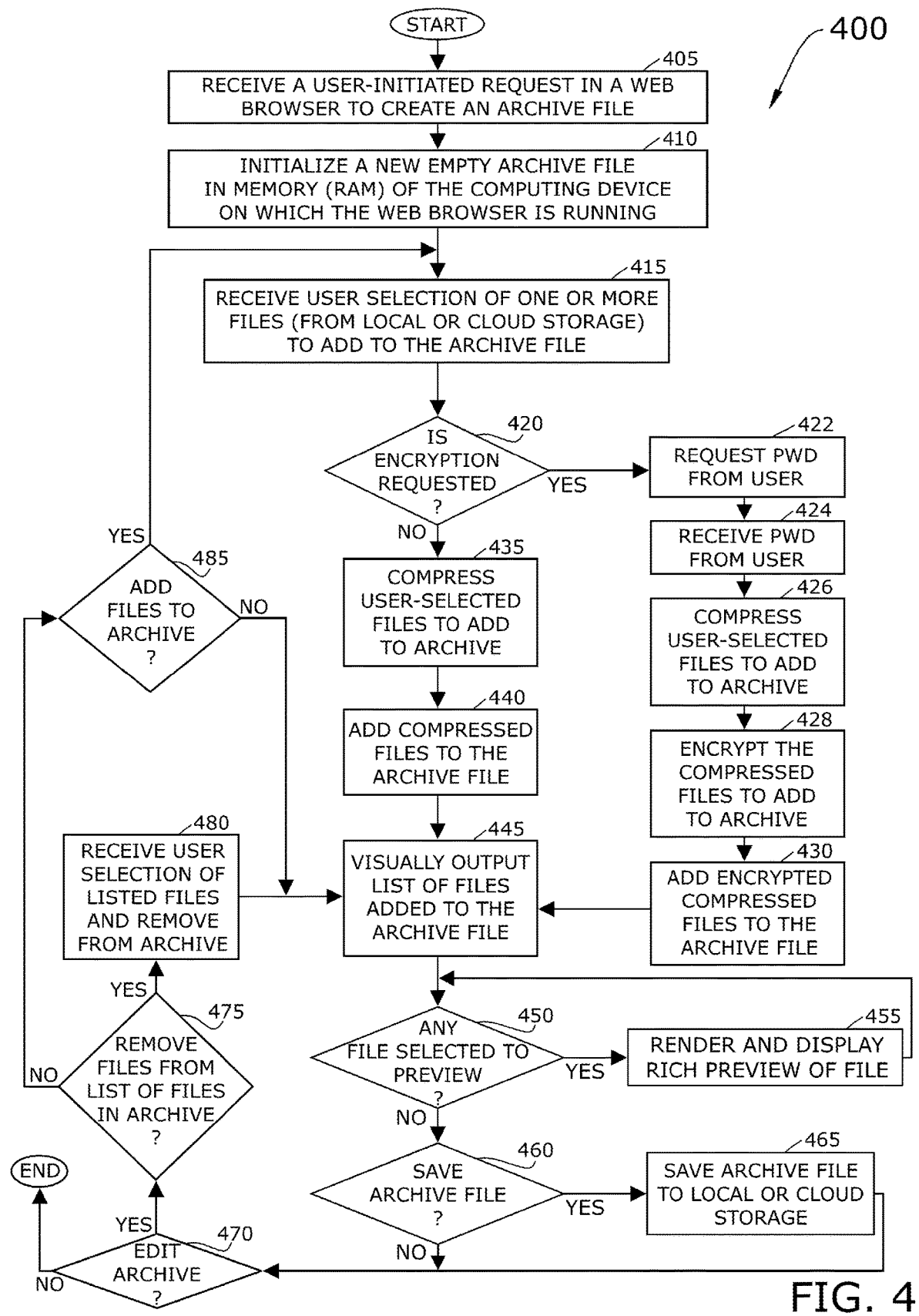
FIG. 4 conceptually illustrates a cloud-based serverless archive file compression process in some embodiments.

By way of example, FIG. 4 conceptually illustrates a cloud-based serverless archive file compression process 400. As shown in this figure, the cloud-based serverless archive file compression process 400 starts upon receiving (at 405) a user-initiated request in a web browser to create an archive file. As noted above, the web browser is running on a computing device of a user, and while it may be connected to a web server, the web server itself only delivers static web page content and a JavaScript archive file creation and extraction engine that is used locally on the user's computing device (and by way of the web browser instance) to create a new archive file (or, as above, decompress an existing archive file and extract one or more files from the archive file). Also, the user may initiate the request to create the archive file in a cloud storage system, such as the first cloud storage provider 155 and by way of selecting the "create new" option from the "new" menu or context menu (at 260) described above, by reference to FIG. 2, or by way of the web browser app itself.

Next, the cloud-based serverless archive file compression process 400 of some embodiments initializes a new empty archive file (at 410) in memory (RAM) of the computing device on which the web browser is running. For example, the cloud-based serverless archive file compression process 400 may initialize the new empty archive file by invoking the app initialization module 205 described above by reference to FIG. 2. After initializing the new empty archive file in memory (at 410), the cloud-based serverless archive file compression process 400 of some embodiments receives user selection of one or more files (at 415) to add to the in-memory archive file. Files may be selected by the user from a local file storage unit resident on the computing device the user has employed to create the in-memory archive file or from a cloud storage system (or multiple cloud storage systems). Similarly, the user may select some files locally and some other files from cloud storage system(s).

In some embodiments, the cloud-based serverless archive file compression process 400 determines (at 420) whether encryption is requested by the user or not. When encryption is requested, the cloud-based serverless archive file compression process 400 continues through a series of steps to encrypt the content items which will be added to the in-memory archive file and the archive file itself, starting with requesting a password from the user (at 422). The cloud-based serverless archive file compression process 400 receives (at 424) the password from the user and then compresses (at 426) the user-selected files which are going to be added to the in-memory archive file. Then, using the password received from the user, the cloud-based serverless archive file compression process 400 encrypts (at 428) the compressed files prior to adding them to the in-memory archive file. After encryption of all the compressed files is completed, the cloud-based serverless archive file compression process 400 of some embodiments adds (at 430) the encrypted compressed files to the in-memory archive file, before moving forward to the next step of displaying the in-memory archive file contents, which is described in further detail below.

Turning back to the determination (at 420), when encryption is not requested by the user, the cloud-based serverless archive file compression process 400 of some embodiments moves ahead with compressing (at 435) the user-selected files which are to be added to the in-memory archive file. Next, the cloud-based serverless archive file compression process 400 adds (at 440) the compressed files to the in-memory archive file. After adding the compressed files to the in-memory archive file (or after adding the encrypted compressed files to the in-memory archive file, when encryption was requested by the user), the cloud-based serverless archive file compression process 400 of some embodiments visually outputs a listing of the files added to the in-memory archive file (at 445). This listing of files added to the in-memory archive file may be formatted similar to the example app screenshot 285 described above, by reference to FIG. 2.

In some embodiments, the listing of files added to the in-memory archive file also allows the user to select and view a preview of any of the files added to the in-memory archive file. This can be useful when the user lacks an application for previewing a particular file added to the in-memory archive file, or may be useful as a convenience to the user, whether or not an associated application is available for opening the file to preview. As such, the cloud-based serverless archive file compression process 400 of some embodiments determines (at 450) whether the user has selected a file from the in-memory archive file to preview. When a file is selected to preview, the cloud-based serverless archive file compression process 400 renders and displays a rich preview of the file (at 455) and then returns to the determination (at 450) of whether any file in the in-memory archive file is selected to preview. For example, the user may select each of several files from the in-memory archive file to preview, one by one, and then when satisfied with previewing the files, may wish to move forward with saving the archive file.

In some embodiments, when the user is done selecting files to preview, the cloud-based serverless archive file compression process 400 determines (at 460) whether to save the in-memory archive file or not. For example, after previewing some files, the user may wish to save the in-memory archive file (locally or in a cloud storage system), or alternatively, may wish to remove a file and/or add another file to the archive file while still in memory and before saving (either locally or cloud storage). When the user wishes to save the archive file, the cloud-based serverless archive file compression process 400 saves (at 465) the in-memory archive file to a local storage unit or to a user-specified cloud storage system (as accessed with user authenticated permission and via file write access API of the cloud storage system). After saving the archive file, the cloud-based serverless archive file compression process 400 determines (at 470) whether the user wishes to edit the archive file or not. When the user wants to edit the archive file, the cloud-based serverless archive file compression process 400 proceeds to the next steps of editing the archive file, which are described in further detail below. However, when the user does not wish to edit the archive file, then the cloud-based serverless archive file compression process 400 ends.

Turning back to the determination (at 460), when the user does not wish to save the in-memory archive file, the cloud-based serverless archive file compression process 400 of some embodiments determines (at 470) whether the user wishes to edit the archive file or not. When the user does not intend to edit the archive file and has not saved the archive file, the user may simply wish to end the process without anything more. However, when the user does wish to edit the in-memory archive file (whether or not the in-memory archive file has been saved or not), the cloud-based serverless archive file compression process 400 determines (at 475) whether to remove one or more files from the listing of files for the in-memory archive file. If the files are being removed from the in-memory archive file after the user has saved the archive file, then the user will be able to re-save the archive after editing is completed. Alternatively, the user will be able to save the edited in-memory archive file as a different archive file that is separate from the previously saved archive file (e.g., saved with a different archive file name).

Referring back to the determination (at 475) of whether to remove files from the in-memory archive file, when the user wishes to remove a file or remove multiple files, the cloud-based serverless archive file compression process 400 receives (at 480) user selection of listed file(s) and removes them from the in-memory archive file. In cases in which the archive file was previously saved, and the user has selected to edit the archive file, only the in-memory archive file is modified in realtime while the saved archive file remains untouched by the editing steps unless and until it is re-saved as the same archive file (same name and location). Then the cloud-based serverless archive file compression process 400 returns to the step of visually outputting (at 445) the list of files added to the in-memory archive file (minus the files removed from the archive), as described above (and proceeding accordingly).

On the other hand, when the user does not wish to remove any files from the in-memory archive file, the cloud-based serverless archive file compression process 400 determines (at 485) whether the user wishes to add more files to the in-memory archive file or not. In some cases, the user decides to neither remove files from nor add files to the in-memory archive file. As such, when the user does not wish to add files (during the editing stage) to the in-memory archive file, the cloud-based serverless archive file compression process 400 of some embodiments returns to the step of visually outputting (at 445) the list of files added to the in-memory archive file, as described above (and proceeding accordingly). However, when the user does wish to add files to the in-memory archive file, then the cloud-based serverless archive file compression process 400 transitions back to the step for receiving (at 415) user selection of one or more (additional) files to add to the in-memory archive file, as described above (and proceeding accordingly). These steps continue until the user saves the in-memory archive file (locally or in cloud storage) and finishes without further edits (either saving in place of a prior saved version of the archive file or as a separate archive file with either a different name and/or different location).

III. Cloud-Based Serverless Archive File Decompression Process

In some embodiments, the cloud-based serverless archive file decompression process performs a plurality of decompression steps for opening an archive file comprising (i) launching an app, by an app initialization module, in a web browser application that is connected to a website while running on a computing device associated with a user, (ii) receiving, from the app in the web browser application that is running on the computing device associated with the user, an archive file identifier ("archive file ID" or "archive ID") and an archive file source comprising one of a local storage unit associated with the computing device of the user and a cloud storage unit accessible by the user in connection with a selection to open an archive file, (iii) reading, by a cloud storage module running in the web browser application, archive file data of the archive file associated with the archive file ID and the archive file source from a particular location comprising one of the local storage unit associated with the computing device of the user and the cloud storage unit accessible by the user, (iv) parsing, by an archive reader module running in the web browser application, the archive file data, (v) displaying, by the archive reader module running in the web browser application, the archive file contents in a view of the web browser, (vi) receiving, in connection with the view of the archive file contents in the web browser, check box selections of particular archive file content items comprising one of a single archive file content item among an entirety of the archive file contents, a plurality of archive file content items among the entirety of the archive file contents, and an entirety of archive file content items that is equal in number to the entirety of the archive file contents, (vi) decrypting, by an archive decryption module running in the web browser application, the particular archive file content items from the archive file (when the archive file is encrypted and based on a valid user-provided password), (vii) decompressing the particular archive file content items by a decompression module running in the web browser application, and (viii) displaying the decompressed particular archive file content items in another view of the web browser in a manner that allows the user to save the particular archive file content items to the local storage unit associated with the computing device of the user or the cloud storage unit accessible by the user.

Figure 5:
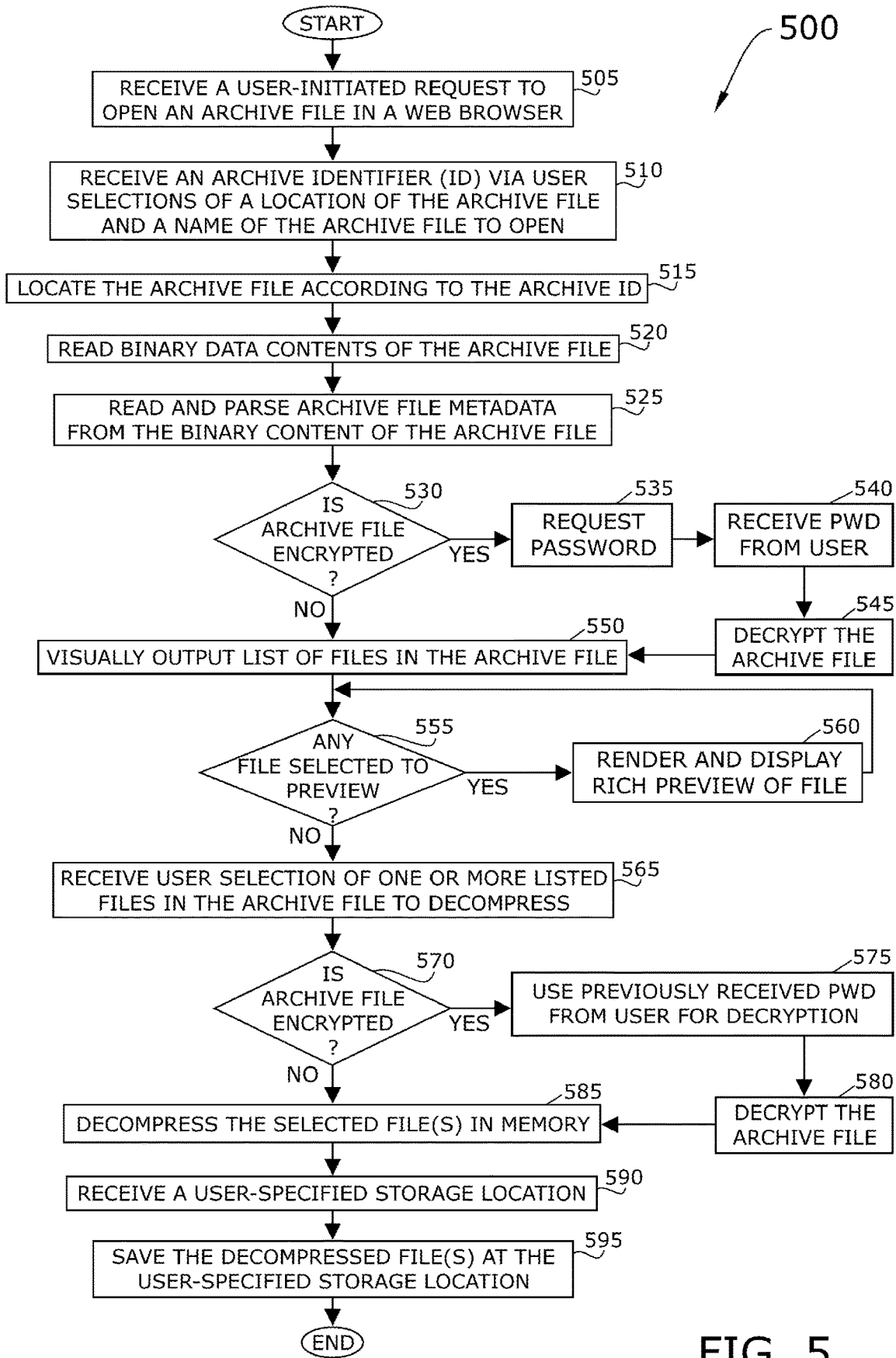
FIG. 5 conceptually illustrates a cloud-based serverless archive file decompression process in some embodiments.

By way of example, FIG. 5 conceptually illustrates a cloud-based serverless archive file decompression process 500. As shown in this figure, the cloud-based serverless archive file decompression process 500 starts upon receiving (at 505) a user-initiated request to open an archive file in a web browser. As noted above, the web browser may display a web page that includes a JavaScript file with application logic for decompressing an archive file, and in which all the processing for decompression occurs within the web browser instance by the JavaScript code (i.e., no backend web server processing at all).

In some embodiments, the cloud-based serverless archive file decompression process 500 receives (at 510) an archive identifier ("archive ID") by way of user selections of a location at which the archive file is stored and a name of the archive file to open. For example, the archive file may be stored in a local file storage of the user's computing device (or mobile device) and, therefore, the user navigates to the storage location of the device and selects the file name of the archive file to open. Alternatively, the user may access a cloud storage provider to access an archive file that is stored in the cloud. In this case, the user is authenticated (either automatically or by providing user credentials) first, and then the user finds the cloud location of the particular archive file to open.

The archive ID (including archive location and archive name) is used by the cloud-based serverless archive file decompression process 500 to locate the archive file (at 515). Upon locating the archive file, the cloud-based serverless archive file decompression process 500 reads binary data contents of the archive file (at 520). In some embodiments, when the archive file is stored in a cloud storage system, code from the file access API for the cloud storage provider is used to read the file contents of the archive file. Next, the cloud-based serverless archive file decompression process 500 reads and parses (at 525) archive file metadata from the binary content of the archive file. The metadata provides information regarding the names of file contents in the archive file and also provides an indication as to whether or not the archive file is encrypted (and therefore needs to be decrypted before continuing).

In some embodiments, the cloud-based serverless archive file decompression process 500 thus determines (at 530) whether the archive file is encrypted. When the archive file is not encrypted, the cloud-based serverless archive file decompression process 500 proceeds to a step at which it visually outputs a list of files in the archive file (at 550). The list of files may look something like the example app screenshot 385 described above, by reference to FIG. 3. On the other hand, when the archive file is encrypted, the cloud-based serverless archive file decompression process 500 requests a password (at 535) to decrypt the encrypted archive file. The password may be requested, for example, by logic in the JavaScript file that presents a data input field for the user to input the password. Next, the cloud-based serverless archive file decompression process 500 receives (at 540) the password from the user (as input by the user). After receiving the password from the user, the cloud-based serverless archive file decompression process 500 decrypts the archive file (at 545). For example, the JavaScript app logic uses the password as a decryption key to decode the encrypted archive file. Of course, if the password is wrong, the archive file cannot be decrypted, and the user may be permitted to re-enter the password for decryption. While this is not shown in this figure, a person of ordinary skill in the relevant art would appreciate that this is a typical manner for a user to provide user credentials and/or passwords. After decrypting the archive file, the cloud-based serverless archive file decompression process 500 proceeds to the next step of visually outputting the list of files in the archive file (at 550). Again, visually outputting the list of files may include a display format similar to the example app screenshot 385 described above, by reference to FIG. 3.

After displaying the list of files in the archive file, the cloud-based serverless archive file decompression process 500 of some embodiments determines (at 555) whether any individual files in the archive file are selected for preview. When a file is selected in the list of files for the archive, then the cloud-based serverless archive file decompression process 500 renders and displays a rich preview of the selected file (at 560). A rich preview process is described in greater detail below, by reference to FIG. 6. The user may select one or more files to preview, in which case the cloud-based serverless archive file decompression process 500 returns to the determination (at 555) of whether a file is selected for preview.

Eventually, when no file is selected for preview (or immediately when the user has no desire for any file preview), the cloud-based serverless archive file decompression process 500 proceeds to the next step of receiving (at 565) user selection of one or more listed files in the archive file to decompress. For example, the list of files in the archive file may be visually output with all file contents being selected by default, in which case the user can accept all files to be decompressed, or alternatively, may select one or more of the listed files to unselect those files for decompression.

At this stage, the cloud-based serverless archive file decompression process 500 makes the determination (at 570) of whether the archive file is encrypted or not. When not encrypted, the cloud-based serverless archive file decompression process 500 decompresses (at 585) the selected files in memory. On the other hand, when the archive file is encrypted, the cloud-based serverless archive file decompression process 500 uses the previously received password from the user for decryption (at 575) and proceeds to decrypt the archive file (at 580). Since these decryption steps are done initially to generate and display a list of files in the archive file, the cloud-based serverless archive file decompression process 500 may simply refer to a value of a variable that is set previously as to whether or not the archive file is encrypted or not—rather than performing some evaluation of the archive file metadata. In any event, after decrypting the archive file, the cloud-based serverless archive file decompression process 500 moves ahead to decompressing (at 585) the selected files in memory. The operations and actions involved in decompressing an archive file vary in ways that relate back to the compression involved in creating the archive file. For example, there are many different types of compression schemes which can be used in creating an archive file. Accordingly, there are many different decompression schemes that relate to the type of compression used to create the archive file. Also, it is generally possible to refer to archiving as the process of aggregating files into a single archive container, whether file compression is applied or not. In some cases, the archive file (i.e., the container file itself) is compressed after one or more individual files have been added to the archive. In other cases (and more commonly), the individual files that are added to an archive are individually compressed, leaving the overall archive file as a mere container of the compressed files in the archive. Therefore, the details of decompression are more involved than the single step (at 585) noted in this process 500. Further and more detailed description is presented in an example of a detailed decompression process is described below, by reference to FIG. 7.

With the decompressed files in memory, the cloud-based serverless archive file decompression process 500 of some embodiments moves forward with permanently storing the decompressed files. To do this, the cloud-based serverless archive file decompression process 500 receives (at 590) a user-specified storage location for the decompressed files and then saves (at 595) the decompressed files at the user-specified storage location. For example, the user may have specified a local file storage location at which to save the decompressed files, or a cloud storage location to save the files. Similarly, the user may have selected only a few of the files to decompress and save to a local file storage location, and then may decide to go back to the archive file and select other remaining (previously unselected) files in the list of the archive file for decompression, extraction, and storage in a cloud storage location. The user may similarly choose to decompress and store all files in a local storage location, and then go back to choose all file files for decompression and storage in a cloud storage location, or in multiple cloud storage locations, etc.

The cloud-based serverless archive file compression process 400, described above by reference to FIG. 4, and the cloud-based serverless archive file decompression process 500, described above by reference to FIG. 5, both include a step for rendering and displaying a rich preview of a file from the in-memory archive file. This step for rendering and displaying the rich preview involves several more detailed steps, which are described next, by reference to FIG. 6.

IV. Cloud-Based Serverless Archive File Rich Preview Process

In some embodiments, the cloud-based serverless archive file rich preview process performs a plurality of rich preview steps for rendering a selection of an uncompressed archive file content item and providing a page preview of the selected uncompressed archive file content item comprising (i) launching an app, by an app initialization module, in a web browser application that is connected to a website while running on a computing device associated with a user (and which runs as a serverless, JavaScript processing engine), (ii) receiving, from the app in the web browser application that is running on the computing device associated with the user, an archive file identifier ("archive file ID" or "archive ID") and an archive file source comprising one of a local storage unit associated with the computing device of the user and a cloud storage unit accessible by the user in connection with a selection to open an archive file, (iii) reading, by a cloud storage module running in the web browser application, archive file data of the archive file associated with the archive file ID and the archive file source from a particular location comprising one of the local storage unit associated with the computing device of the user and the cloud storage unit accessible by the user, (iv) parsing, by an archive reader module running in the web browser application, the archive file data, (v) displaying, by the archive reader module running in the web browser application, the archive file contents in a view of the web browser, (vi) receiving, in connection with the view of the archive file contents in the web browser, a single check box selection of an uncompressed archive file content item in the archive file contents, (vi) decrypting, by an archive decryption module running in the web browser application, the selected uncompressed archive file content item from the archive file (when the archive file is encrypted and based on a valid user-provided password), (vii) decompressing the selected uncompressed archive file content item by a decompression module running in the web browser application, (viii) rendering content of the decompressed archive file content item in realtime by an archive rendering module running in the web browser application, (ix) generating a rich preview of the rendered content of the decompressed archive file content item, and (x) displaying the generated rich preview of the rendered content of the decompressed archive file content item in the web browser.

Figure 6:
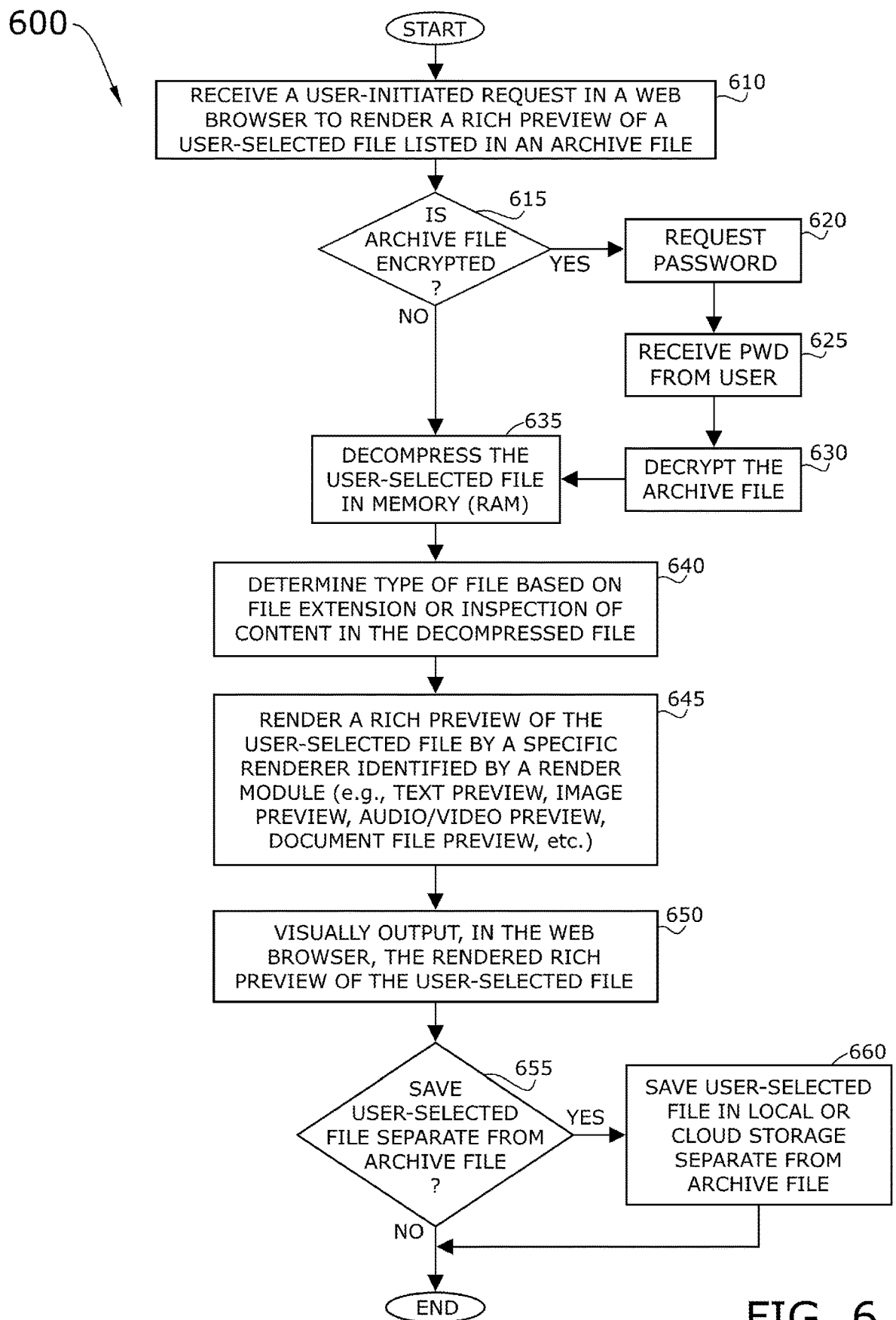
FIG. 6 conceptually illustrates a cloud-based serverless archive file rich preview process in some embodiments.

By way of example, FIG. 6 conceptually illustrates a cloud-based serverless archive file rich preview process 600. The cloud-based serverless archive file rich preview process 600 may be performed to carry out the steps for rendering and displaying the rich preview of the file (at 455 and at 560) in the cloud-based serverless archive file compression process 400 described above, by reference to FIG. 4, and in the cloud-based serverless archive file decompression process 500 described above, by reference to FIG. 5, respectively. Alternatively, the cloud-based serverless archive file rich preview process 600 may be performed in connection with other processes for handling archive files which may be included in the scope of the present disclosure, even if not expressly described in this specification.

In some embodiments, the cloud-based serverless archive file rich preview process 600 starts upon receiving (at 610) a user-initiated request in a web browser to render a rich preview of a user-selected file listed in an archive file. Next, the cloud-based serverless archive file rich preview process 600 determines (at 615) whether the archive file is encrypted or not. When the archive file is not encrypted, the cloud-based serverless archive file rich preview process 600 decompresses (at 635) the user-selected file from the archive file in memory (RAM). However, when the archive file is encrypted, the cloud-based serverless archive file rich preview process 600 performs a series of steps for decrypting the archive file, including requesting the password (at 620) from the user to decrypt the archive file, receiving the password from the user (at 625) to use in decrypting the archive file, and then decrypting (at 630) the archive file with the user-provided password. Then the cloud-based serverless archive file rich preview process 600 decompresses (at 635) the user-selected file from the archive file in memory (RAM).

As noted above in connection with the cloud-based serverless archive file decompression process 500, described above by reference to FIG. 5, the operations and actions involved in decompressing an archive file vary in ways that relate back to the compression involved in creating the archive file. For example, there are many different types of compression schemes which can be used in creating an archive file. Accordingly, there are many different decompression schemes that relate to the type of compression used to create the archive file. Also, it is generally possible to refer to archiving as the process of aggregating files into a single archive container, whether file compression is applied or not. In some cases, the archive file (i.e., the container file itself) is compressed after one or more individual files have been added to the archive. In other cases (and more commonly), the individual files that are added to an archive are individually compressed, leaving the overall archive file as a mere container of the compressed files in the archive. Therefore, the details of decompression are more involved than the single step (at 635) noted in this rich preview process 600. Also, an example of a detailed decompression process is described below, by reference to FIG. 7.

After decompressing the user-selected file from the archive file in memory, the cloud-based serverless archive file rich preview process 600 of some embodiments determines (or identifies) the type of file is the user-selected file in the archive (at 640). In some embodiments, the type of file is determined (or identified) based on a file extension for the file in the archive file. In some embodiments, the type of file is determined (or identified) based on an inspection of the content in the decompressed file by the cloud-based serverless archive file rich preview process 600.

Upon identifying (or determining) the file type, the cloud-based serverless archive file rich preview process 600 of some embodiments renders a rich preview of the user-selected file (at 645) by way of a specific renderer identified by a render module. In some embodiments, the rich preview of the user-selected file is a text file preview based on the render module generating the preview for a text file type. In some embodiments, the rich preview of the user-selected file is an image file preview based on the render module generating an image preview for a particular image file type. In some embodiments, the rich preview of the user-selected file is an audio/visual file preview based on the render module generating the preview for at least one of an audio file type and a video file type. In some embodiments, the rich preview of the user-selected file is a document file preview based on the render module generating the preview for a document file type.

After the rich preview of the user-selected decompressed file is generated, the cloud-based serverless archive file rich preview process 600 visually outputs, in the web browser, the rendered rich preview (at 650) of the user-selected file. While a rich preview may typically include a visual component, a person of ordinary skill in the art would appreciate that a rich preview of an audio-only file would entail playback of audio contained in the audio-only file, and may only display a visual playback user interface control for the user to interact with in playing back the audio file.

In some embodiments, the cloud-based serverless archive file rich preview process 600 then determines (at 655) whether to save the user-selected file separate from the archive file. For example, after previewing the rich preview of the user-selected file, the user may wish to save the file separately in a file storage, such as local file storage and/or cloud file storage. When the user does not wish to save the user-selected file separate from the archive file, the cloud-based serverless archive file rich preview process 600 ends. On the other hand, when the user wishes to save the user-selected file separate from the archive file, then the cloud-based serverless archive file rich preview process 600 saves (at 660) the user-selected file separate from the archive file in a local file storage or a cloud storage system (as specified by the user). Also, when any richly previewed file is selected and saved separate from the archive file, the archive file also continues to retain its compressed file within the archive file. Then the cloud-based serverless archive file rich preview process 600 ends. Note that the user may restart the cloud-based serverless archive file rich preview process 600 any time the user selects another file from the archive file to preview, or selects other files in other archive files (whether in-memory archive files in the process of creation or saved archive files selected and loaded into memory to view, preview, extract, etc.).

V. Detailed Decompression Process

Figure 7:
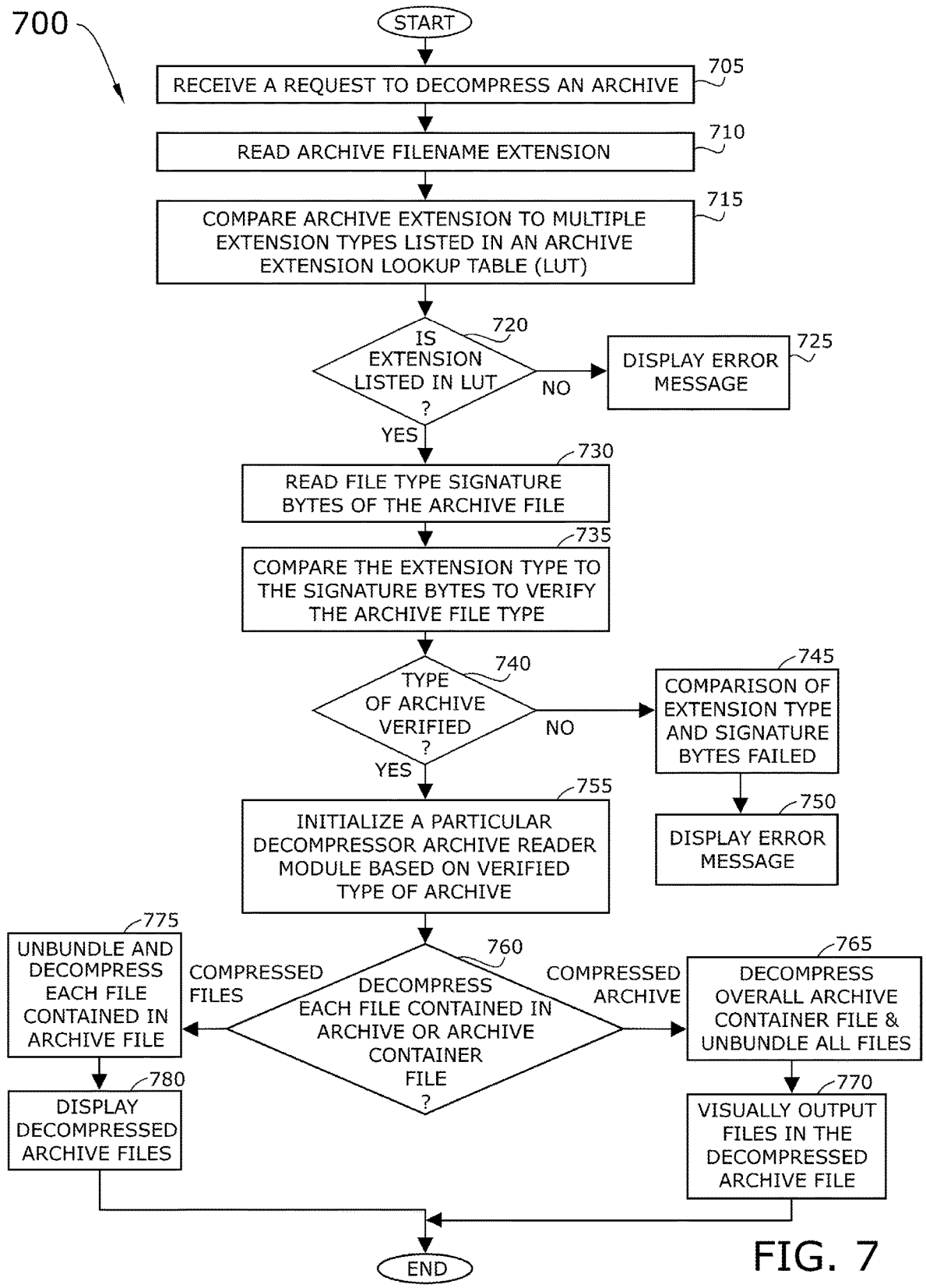
FIG. 7 conceptually illustrates a detailed decompression process in some embodiments.

By way of example, FIG. 7 conceptually illustrates a detailed decompression process 700. The detailed decompression process 700 may be performed, in whole or in part, to carry out the steps for archive file decompression (at 585 and at 635) in the cloud-based serverless archive file decompression process 500 described above, by reference to FIG. 5, and in the cloud-based serverless archive file rich preview process 600 described above, by reference to FIG. 6, respectively. Alternatively, the detailed decompression process 700 may be performed independently of other processes, or in connection with other processes for handling decompression of archive files which may be included in the scope of the present disclosure, even if not expressly described in this specification.

In some embodiments, the detailed decompression process 700 starts by receiving (at 705) a request to decompress an archive. The request may be made by a user interacting with a user interface of an archive file creation and opening/decompression application, where the request involves a selection of the archive file by the user. Next, the detailed decompression process 700 of some embodiments reads (at 710) the extension of the archive filename. The common practice of designating filename extensions as particular types of files, which may be associated with particular applications and/or may be organized in a particular binary data format, allows the detailed decompression process 700 to distinguish between different types of archive file formats. In some embodiments, an archive extension look-up table ("LUT") stores a list of known archive filename extensions. For example, the archive LUT may list known archive extensions including, without limitation, ZIP, TAR, RAR, BZIP, TAR.GZ, 7z, XZ, or other archive extensions to designate types of archive files based on future compression schemes or algorithms.

After inspecting the filename extension, the detailed decompression process 700 of some embodiments compares (at 715) the archive extension to the known archive filename extensions listed in the archive LUT. Next, the detailed decompression process 700 determines (at 720) whether the archive extension is listed in the archive LUT. When the archive extension is not listed in the archive LUT, the detailed decompression process 700 of some embodiments displays an error message (at 725). For example, the user may have mistakenly selected a file which is not an archive file at all. The error message just informs the user of the error, and the user can go back to re-select the archive file originally intended, or otherwise continue with other archive file selections.

On the other hand, when the archive extension is listed as an archive type in the archive LUT, the detailed decompression process 700 of some embodiments reads (at 730) file type signature bytes ("signature bytes") of the archive file. The signature bytes (also known in some cases as "magic bytes" or "header bytes", even if not at the beginning of a file) uniquely identify a file type and, therefore, act as a signature of the archive compression type and may include notation of a type of decompressor which would be used to decompress the archive. Specifically, the signature bytes include certain information about the archive file, the decompressor, and the compression scheme used in compressing the files stored in the archive container or the compression scheme used to compress the overall archive file.

In some embodiments, the detailed decompression process 700 compares (at 735) the archive extension type to the file type information in the signature bytes to verify the archive file type. For example, the user may select a file "ABC.zip" to decompress, which would seem to be a valid archive file based on the ".zip" extension, but if the signature bytes are not found at the expected location (based on the type of extension) or do not include file type information that validates a type of archive signature expected for ".zip" extension and which is associated with a specific ZIP decompressor, then there would be a problem in trying to decompress the "ABC.zip" file using the ZIP decompressor. After comparing, the detailed decompression process 700 of some embodiments determines (at 740) whether the type of archive has been verified by the comparison. When the type of archive is not verified, the detailed decompression process 700 makes the determination that the comparison of the extension type and the file type information in the signature bytes has failed (at 745). Then the detailed decompression process 700 displays (at 750) an error message. For example, the detailed decompression process 700 may display an error message stating "Error reading ZIP file. Error details: ZIP file is invalid or corrupted—Did not find EOCDR signature". However, in some embodiments, instead of displaying an error message, the detailed decompression process 700 proceeds with the information in the signature bytes, when such signature bytes are read and understood to refer to a particular decompressor type. While this is not show in FIG. 7 for the detailed decompression process 700, a person of ordinary skill in the relevant art would appreciate that this fallback option is possible and oftentimes recommended for any implementation of the detailed decompression process 700 (in whole, in part, or as part of a larger program, etc.)

However, when the type of archive is verified by the comparison of the extension type to the file type information in the signature bytes, the detailed decompression process 700 of some embodiments initializes (at 755) a particular decompressor archive reader module based on the verified type of archive. In some embodiments, a particular decompressor is stored in archive metadata as part of the archive format itself. Since an archive is a container format that typically contains compressed files, the actual decompressor to which the compressed files are subject can be read from the archive metadata, and then used to decompress the compressed files in the archive. Note that this description does not take into account the presence of encryption, if any, and other intermediate steps that may be involved in any practical application of the detailed decompression process.

Another aspect of archive file formats—which influences the detailed decompression process 700 described here—is the subtle difference between how an archive is created. Many archive file formats are container formats that contain one or more individually compressed files while another common archive format bundles one or more uncompressed files, which are subject to post-compression of the overall archive file. Specifically, the container-type archive format typically involves compression of one or more files (individually compressed files) followed by bundling the compressed files in the archive. In contrast, the other archive format (and a common archive format, e.g., the TAR.GZ archive/post-compression format) starts by bundling the files into the archive, followed by an optional post-bundling step of compressing the overall archive. This is the case, for example, with the common archive format TAR.GZ, in which the "TAR" archiver bundles the files, while the "GZ" compressor is used to compress the final single archive. In that case, the compressor algorithm has no concept of metadata, etc., because it simply compresses a set of bytes for the final single archive file. This is conceptually the opposite of ZIP which archives—by grouping and cataloging—subordinate compressed files. That is, compressing individual files first, followed by archiving (bundling and cataloging) the compressed files in the final archive file (as typically performed for such formats as ZIP, TAR, RAR, BZIP, 7z, XZ, etc.).

Thus, the detailed decompression process 700 of some embodiments determines (at 760) whether to decompress each file contained in the archive or to decompress the overall archive container file. The determination is based on whether the archive is a compressed archive created by "archiving followed by compressing" or is an archive of compressed files created by "compressing individual files followed by archiving". When the archive is determined to be a compressed archive, created by "archiving followed by compressing", the detailed decompression process 700 of some embodiments decompresses (at 765) the overall archive container file and then unbundles (or "unarchives") all the decompressed file. Then the detailed decompression process 700 visually outputs (at 770) the files from the decompressed archive file. Then the detailed decompression process 700 ends.

On the other hand, when the archive is determined to be an archive of compressed files, created by "compressing individual files followed by archiving", the detailed decompression process 700 of some embodiments proceeds to unbundle and decompress (at 775) each file contained in the archive file and, after unbundling and decompressing, displays (at 780) the decompressed archive files. Then the detailed decompression process 700 ends.

The above-described embodiments of the invention are presented for purposes of illustration and not of limitation.

VI. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
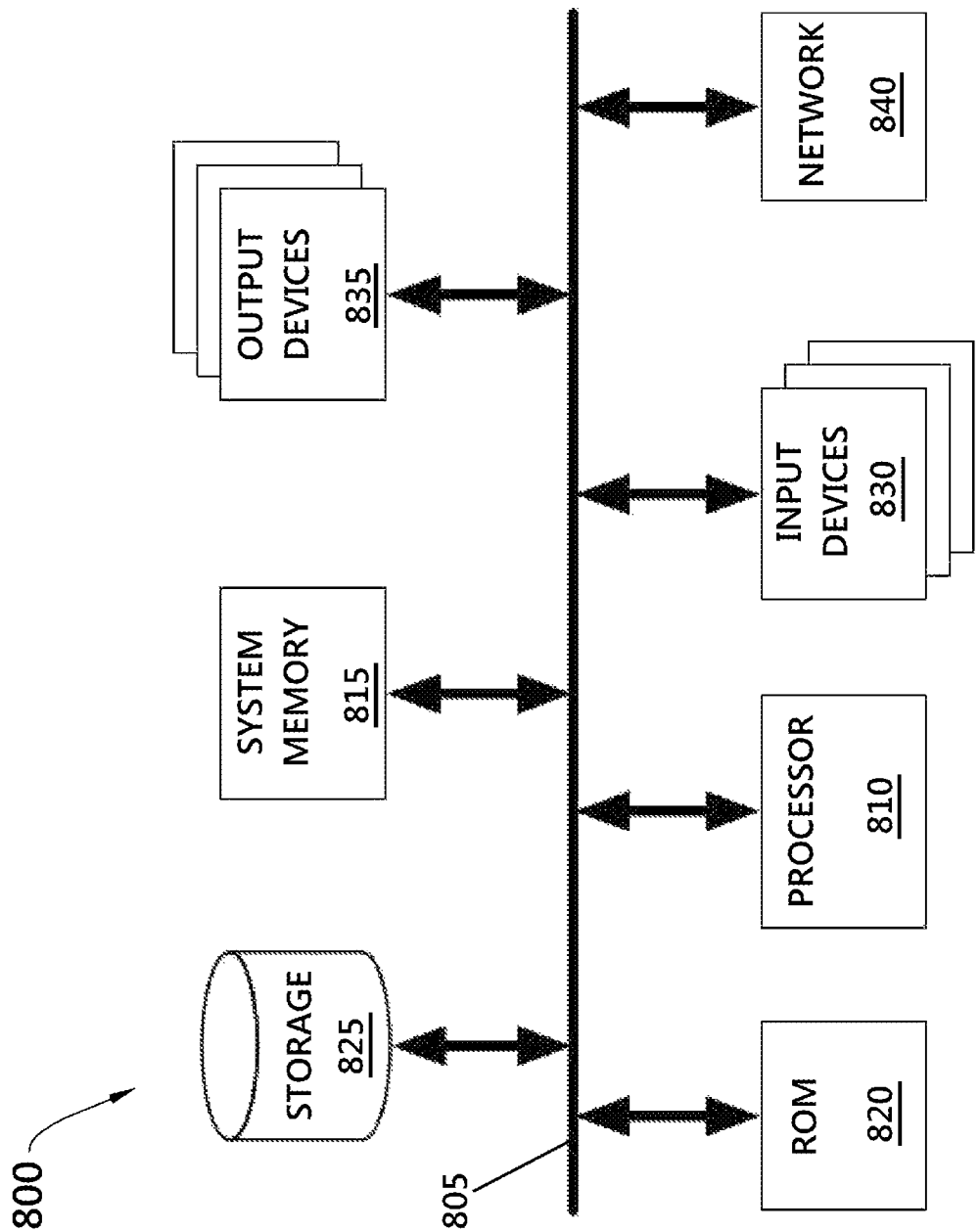
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer, mobile device (smartphone, tablet computing device, PDA), wearable computing device (smart watch, etc.), or any other sort of electronic device. Such an electronic system includes various types of computer readable media and interfaces for various other types of computer readable media. Electronic system 800 includes a bus 805, processing unit(s) 810, a system memory 815, a read-only 820, a permanent storage device 825, input devices 830, output devices 835, and a network 840.

The bus 805 collectively represents all system, peripheral, and chipset buses that communicatively connect the numerous internal devices of the electronic system 800. For instance, the bus 805 communicatively connects the processing unit(s) 810 with the read-only 820, the system memory 815, and the permanent storage device 825.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 825.

Other embodiments use a removable storage device (such as a floppy disk or a flash drive) as the permanent storage device 825. Like the permanent storage device 825, the system memory 815 is a read-and-write memory device. However, unlike storage device 825, the system memory 815 is a volatile read-and-write memory, such as a random access memory. The system memory 815 stores some of the instructions and data that the processor needs at runtime. In some embodiments, the invention's processes are stored in the system memory 815, the permanent storage device 825, and/or the read-only 820. For example, the various memory units include instructions for processing appearance alterations of displayable characters in accordance with some embodiments. From these various memory units, the processing unit(s) 810 retrieves instructions to execute and data to process in order to execute the processes of some embodiments.

The bus 805 also connects to the input and output devices 830 and 835. The input devices enable the user to communicate information and select commands to the electronic system. The input devices 830 include alphanumeric keyboards and pointing devices (also called "cursor control devices"). The output devices 835 display images generated by the electronic system 800. The output devices 835 include printers and display devices, such as cathode ray tubes (CRT) or liquid crystal displays (LCD). Some embodiments include devices such as a touchscreen that functions as both input and output devices.

Finally, as shown in FIG. 8, bus 805 also couples electronic system 800 to a network 840 through a network adapter (not shown). In this manner, the computer can be a part of a network of computers (such as a local area network ("LAN"), a wide area network ("WAN"), or an intranet), or a network of networks (such as the Internet). In this way, static web content can be delivered to the user computing device when connected to the network of computers (such as the Internet and delivery of the website page and JavaScript file that runs within the web browser instance, with no backend, over-the-network processing for compression, decompression, or reading/opening of archive files described in this specification).

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 4-7 conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A web-based, in-browser, cloud storage enabled method for creating archive files, said method comprising:
    connecting, by a web browser application that is running on a computing device operated by a user, to a web server that hosts a web site;
    determining, by the web browser running on the computing device operated by the user, whether an archive file creation engine is stored in a local cache available to the web browser application that is running on the computing device operated by the user;
    receiving, when the archive file creation engine is not stored in the local cache, the archive file creation engine from the web server and by the web browser, wherein the received archive file creation engine is stored in the local cache to use for creation of archive files within the web browser application on the computing device operated by the user;
    launching, in the web browser running on the computing device operated by the user, an application initialization module in connection with the website, wherein the application initialization module loads static content of the website and the archive creation engine in the web browser;
    receiving a selection in the static content of the website to create an archive file;

initializing, by the archive file creation engine running within the web browser application that is running on the computing device operated by the user, a new empty archive file in random access memory (RAM) of the computing device on which the web browser application is running;

receiving, by the web browser application that is running on the computing device operated by the user, selection of one or more files to add to the archive file;

compressing the selected files added to the archive file by a compression module running as part of the archive file creation engine in the web browser application that is running on the computing device operated by the user;

displaying, by an archive writer module running as part of the archive file creation engine in the web browser application that is running on the computing device operated by the user, the archive file and the compressed files added to the archive file; and saving the archive file as a compressed archive file at a user-specified storage location.

2. The web-based, in-browser, cloud storage enabled method for creating archive files of claim 1 further comprising:

determining, prior to compressing the selected files added to the archive file by the compression module of the archive file creation engine in the web browser application that is running on the computing device operated by the user, whether the user intends to encrypt the archive file and require a password for decryption; and encrypting, after compression, the compressed files added to the archive file, by an archive encryption module running in the web browser application that is running on the computing device operated by the user, when the user provides a password to secure the encrypted archive file.

3. The web-based, in-browser, cloud storage enabled method for creating archive files of claim 1, wherein the user-specified storage location comprises one of a local storage unit associated with the computing device of the user and a cloud storage unit accessible by the user through a cloud storage module running in the web browser application.

4. The web-based, in-browser, cloud storage enabled method for creating archive files of claim 1 further comprising editing the archive file by an edit action comprising one of adding a file to the archive file and removing a compressed file from the archive file, wherein the edit action is triggered at a particular time comprising one of prior to saving the archive file and after saving the compressed archive file.

5. The web-based, in-browser, cloud storage enabled method for creating archive files of claim 4, wherein editing the archive file comprises editing the compressed archive file in RAM memory of the computing device on which the web browser application is running.

6. The web-based, in-browser, cloud storage enabled method for creating archive files of claim 1, wherein the static content of the website is locally cached and the web browser application is connected to the locally cached static content of the website, wherein the web-based, in-browser, cloud storage enabled method further comprises launching an app initialization module in offline mode in the web browser application.

7. The web-based, in-browser, cloud storage enabled method for creating archive files of claim 1 further comprising rendering and displaying a rich preview of a particular user-selected file added to the archive file.

8. The web-based, in-browser, cloud storage enabled method for creating archive files of claim 7 further comprising:

decompressing the particular user-selected file added to the archive file;

identifying a specific renderer to use in rendering content of the particular user-selected file added to the archive file in realtime by an archive rendering module running in the web browser application;

initializing the specific renderer by the archive rendering module running in the web browser application;

passing data of the decompressed archive file to the specific renderer;

processing the data of the decompressed archive file by the specific renderer;

rendering, by the specific renderer, a rich preview of the processed data of the particular user-selected file added to the archive file; and displaying, in the web browser, the rendered rich preview of the particular user-selected file added to the archive file.

9. The web-based, in-browser, cloud storage enabled method for creating archive files of claim 8 further comprising determining whether the archive file is encrypted before decompressing and rendering content of the particular user-selected file added to the archive file.

10. The web-based, in-browser, cloud storage enabled method for creating archive files of claim 9 further comprising:

requesting a password from the user when the archive file is encrypted;

receiving the password from the user; and decrypting the encrypted archive file with the received password in order to decompress and render content of the particular user-selected file added to the archive file.

11. A web-based, in-browser, cloud storage enabled method for opening and decompressing archive files in archive format, said method comprising:

connecting, by a web browser application that is running on a computing device operated by a user, to a web server that hosts a web site;

determining, by the web browser running on the computing device operated by the user, whether an archive file decompression engine is stored in a local cache available to the web browser application that is running on the computing device operated by the user;

receiving, when the archive file decompression engine is not stored in the local cache, the archive file decompression engine from the web server and by the web browser, wherein the received archive file decompression engine is stored in the local cache to use for decompression of archive files within the web browser application on the computing device operated by the user;

launching, in the web browser running on the computing device operated by the user, an application initialization module in connection with the website, wherein the application initialization module loads static content of the website and the archive decompression engine in the web browser;

receiving in the static content of the website, a selection to open an archive file;

receiving, by the archive file decompression engine running within the web browser application that is running on the computing device operated by the user, an archive file identifier ("archive file ID") comprising an archive file name and an archive file source;

reading, by a cloud storage module that is part of the archive file decompression engine running within the web browser application that is running on the computing device operated by the user, binary data contents of the archive file associated with the archive file ID from the archive file source;

parsing, by an archive reader module that is part of the archive file decompression engine running within the web browser application that is running on the computing device operated by the user, the archive file metadata from the binary data contents of the archive file;

displaying, in a view of the web browser that is visually output onto a screen of the computing device operated by the user, a listing of files in the archive file as derived by parsing the archive file metadata by the archive reader module running in the web browser application on the computing device operated by the user;

decompressing, by a decompression module that is part of the archive file decompression engine running within the web browser application that is running on the computing device operated by the user, one or more compressed files selected by the user from the listing of files in the archive file;

writing the one or more decompressed files to a particular location comprising one of the archive file source and another user-specified storage location; and displaying the one or more decompressed files in another view of the web browser that is visually output onto the screen of the computing device operated by the user.

12. The web-based, in-browser, cloud storage enabled method for opening and decompressing archive files in archive format of claim 11, wherein the archive file source comprises one of a local storage unit associated with the computing device of the user and a cloud storage unit accessible by the user in connection with a selection to open an archive file.

13. The web-based, in-browser, cloud storage enabled method for opening and decompressing archive files in archive format of claim 11 further comprising:

receiving, in connection with the displayed listing of files in the archive file, a selection of a particular listed file associated with a compressed archive file contained in the archive file;

decompressing the compressed archive file associated with the selected particular listed file;

identifying a specific renderer to use in rendering content of the decompressed archive file in realtime by an archive rendering module that is part of the archive file decompression engine running within the web browser application that is running on the computing device operated by the user;

initializing the specific renderer by the archive rendering module of the archive file decompression engine running within the web browser application that is running on the computing device operated by the user;

passing data of the decompressed archive file to the specific renderer for local processing on the computing device operated by the user;

processing the data of the decompressed archive file by the specific renderer running within the web browser application on the computing device operated by the user;

rendering, by the specific renderer running within the web browser application on the computing device operated by the user, a rich preview of the processed data of the decompressed archive file; and displaying the rendered rich preview of the decompressed archive file in the web browser that is visually output onto the screen of the computing device operated by the user.

14. The web-based, in-browser, cloud storage enabled method for opening and decompressing archive files in archive format of claim 11 further comprising:

determining, by the archive file decompression engine running within the web browser application that is running on the computing device operated by the user, whether the archive file is encrypted;

requesting a password for decryption when the archive file is encrypted;

receiving, by an archive decryption module that is started by the archive file decompression engine running within the web browser application that is running on the computing device operated by the user, a user-provided password when the archive file is encrypted; and decrypting, by the archive decryption module that is started by the archive file decompression engine running within the web browser application that is running on the computing device operated by the user, the archive file with the user-provided password.

15. The web-based, in-browser, cloud storage enabled method for opening and decompressing archive files in archive format of claim 11, wherein decompressing the one or more compressed files in the archive file comprises:

reading an archive filename extension associated with the archive file;

comparing the archive filename extension to a plurality of extension types in a look-up table;

identifying a particular extension type in the look-up table that is the same as the archive filename extension;

reading, by the decompression module that is part of the archive file decompression engine running within the web browser application that is running on the computing device operated by the user, a plurality of signature bytes of the archive file;

comparing, by the decompression module that is part of the archive file decompression engine running within the web browser application that is running on the computing device operated by the user, the particular extension type to the plurality of signature bytes to verify the archive file type;

determining, by the decompression module that is part of the archive file decompression engine running within the web browser application that is running on the computing device operated by the user, whether the particular extension type is consistent with the plurality of signature bytes;

displaying an error message when the particular extension type is not consistent with the plurality of signature bytes; and initializing, by the decompression module that is part of the archive file decompression engine running within the web browser application that is running on the computing device operated by the user, a particular decompressor archive reader module based on the verified archive file type when the particular extension type is consistent with the plurality of signature bytes.

16. The web-based, in-browser, cloud storage enabled method for opening and decompressing archive files of claim 11, wherein the website is locally cached and the web browser application is connected to the locally cached website, wherein the web-based, in-browser, cloud storage enabled method further comprises launching an app initialization module in offline mode in the web browser application.

* * * * *